US010150918B2

(12) United States Patent
Hegmann et al.

(10) Patent No.: US 10,150,918 B2
(45) Date of Patent: Dec. 11, 2018

(54) PATTERNED LIQUID CRYSTAL ALIGNMENT USING INK-JET PRINTED NANOPARTICLES AND USE THEREOF TO PRODUCE PATTERNED, ELECTRO-OPTICALLY ADDRESSABLE DEVICES; INK-JET PRINTABLE COMPOSITIONS

(71) Applicant: KENT STATE UNIVERSITY, Kent, OH (US)

(72) Inventors: Torsten Hegmann, Kent, OH (US); Anshul Sharma, Kent, OH (US); Dmytro Reznikov, Sunnyvale, CA (US)

(73) Assignee: Kent State University, Kent, OH (US)

( * ) Notice: Subject to any disclaimer, the term of this patent is extended or adjusted under 35 U.S.C. 154(b) by 463 days.

(21) Appl. No.: 14/783,238

(22) PCT Filed: Apr. 14, 2014

(86) PCT No.: PCT/US2014/033945
§ 371 (c)(1),
(2) Date: Oct. 8, 2015

(87) PCT Pub. No.: WO2014/172252
PCT Pub. Date: Oct. 23, 2014

(65) Prior Publication Data
US 2016/0060529 A1    Mar. 3, 2016

Related U.S. Application Data

(60) Provisional application No. 61/853,994, filed on Apr. 15, 2013.

(51) Int. Cl.
C09D 11/36     (2014.01)
C09D 11/38     (2014.01)
C09D 11/52     (2014.01)
C09K 19/56     (2006.01)
C09K 19/52     (2006.01)
B41J 2/01      (2006.01)
G02F 1/1337    (2006.01)
G02F 1/1333    (2006.01)
G02F 1/1343    (2006.01)

(52) U.S. Cl.
CPC ............... C09K 19/56 (2013.01); B41J 2/01 (2013.01); C09K 19/52 (2013.01); G02F 1/13439 (2013.01); G02F 1/133305 (2013.01); G02F 1/133711 (2013.01); G02F 1/133719 (2013.01); G02F 1/133753 (2013.01); C09K 2019/521 (2013.01); C09K 2019/525 (2013.01); G02F 2001/133738 (2013.01)

(58) Field of Classification Search
CPC ......... C09D 11/36; C09D 11/38; C09D 11/52; C09K 19/56; C09K 19/52; C09K 2019/521; C09K 2019/525; B41J 2/01

USPC ............................................... 106/31.9, 31.92
See application file for complete search history.

(56) References Cited

U.S. PATENT DOCUMENTS

| 6,921,626 | B2* | 7/2005 | Ray | H05K 3/02 |
| | | | | 430/270.1 |
| 7,968,008 | B2* | 6/2011 | Parashar | C09D 11/38 |
| | | | | 252/500 |
| 8,071,181 | B2 | 12/2011 | Hegmann et al. | |
| 8,092,712 | B2* | 1/2012 | Hegmann | C09K 19/52 |
| | | | | 252/299.65 |
| 8,294,838 | B2 | 10/2012 | Hegmann et al. | |
| 8,323,755 | B2 | 12/2012 | Hegmann et al. | |
| 8,383,085 | B2* | 2/2013 | Hegmann | A61K 9/5115 |
| | | | | 424/489 |
| 2004/0250750 | A1 | 12/2004 | Reda et al. | |
| 2006/0254502 | A1 | 11/2006 | Garrou et al. | |
| 2008/0145560 | A1* | 6/2008 | Khaselev | C09D 11/52 |
| | | | | 106/31.13 |
| 2009/0027611 | A1 | 1/2009 | Hegmann et al. | |
| 2009/0029148 | A1* | 1/2009 | Hashimoto | B01J 13/0043 |
| | | | | 252/512 |
| 2011/0143051 | A1* | 6/2011 | Ohashi | C09D 11/0235 |
| | | | | 427/553 |

(Continued)

OTHER PUBLICATIONS

Meng et al., "Viscosity measurements of ortho-xylene, meta-xylene, para-xylene and ethylbenzene", J. Chem. Thermodynamics 95, 2016, pp 116-123; 8 pages.*
Isopar L Properties, files.brenntag.pl/00155D4267041ED691A2F9BB13A800C4; Nov. 2015; 1 page.*
Spark Fire Isopar data, Isopar Solvents Properties; https://www.sparkfiredance.com/wp-content/uploads/2016/03/Spark-Fire-Isopar-data-index.pdf, no date available; 1 page.*
Typical Properties of Hydrocarbon Solvents, https://www.productsafetyguide.com/-/media/Files/EMEAF_FAAG_brochure2017.ashx, 2017; 4 pages.*
Viscosity and Surface Tension of Selected Liquids, Table of Viscosity, Surface Tension, Specific Density and Molecular Weight of Selected Liquids; https://www.accudynetest.com/visc_table_print.html, 2014; 6 pages.*

(Continued)

Primary Examiner — Helene Klemanski
(74) Attorney, Agent, or Firm — Hudak, Shunk & Farine Co. LPA

(57) ABSTRACT

Ink-jet printable compositions including nanoparticles capped with a protective layer of hydrocarbon chains and a single solvent exhibiting a single evaporation rate and having a specifically defined viscosity and surface tension that result in uniform and printable alignment layers for liquid crystal materials. Patterned liquid crystal-containing cells are also disclosed including one or more layers including the same or different nanoparticles capped with a protective layer of hydrocarbon chains printed on a surface of a substrate or even another nanoparticle-containing layer. Methods for producing the cells are also disclosed, including the step of printing a pattern on one or more portions of a cell surface utilizing a composition comprising the capped nanoparticles. Devices including the cells are also disclosed.

7 Claims, 16 Drawing Sheets

(56) References Cited

U.S. PATENT DOCUMENTS

| | | | |
|---|---|---|---|
| 2011/0269632 A1* | 11/2011 | Haick | G01N 33/574 506/7 |
| 2012/0100304 A1 | 4/2012 | Cruchon-Dupeyrat et al. | |
| 2013/0334470 A1* | 12/2013 | Kurihara | C09D 11/52 252/514 |
| 2015/0231698 A1* | 8/2015 | Kurihara | C09D 11/52 252/514 |
| 2017/0043396 A1* | 2/2017 | Koduma | B22F 1/02 |

OTHER PUBLICATIONS

Pressure Drop Curves; Viscosity Information, https://www.istec-corp.com/products/oil-meter-pressure-drop-curves.pdf, no date available; 3 pages.*

Van Haaren J., Wiping out dirty displays, Nature, 2001, pp. 29-30, vol. 411, Macmillan Magazines Ltd.

Harris K.D., et al., A Birefringent and Transparent Electrical Conductor, Adv. Funct. Mater., 2008, pp. 2147-2153, vol. 18.

Kim, Y.H., et al., Flexible Liquid-Crystal Display Stabilized by Pixel Walls Directly Bonded via Ion-Beam Irradiation, J. Electrochem. Soc, 2008, pp. J371-J374, vol. 155 (12).

Hegde, G., et al., Plasma-beam alignment technique for ferroelectric liquid crystals, J. Soc. Inf. Display, SID 16, 2008, pp. 1075-1079, vol. 10.

Chaudhari, P., et al., Atomic-beam alignment of inorganic materials for liquid-crystal displays, Nature, May 3, 2001, pp. 56-59, vol. 411, Macmillan Magazines Ltd.

Yaroshchuk, O., et al., Photoalignment of liquid crystals: basics and current trends, J. Mater. Chem., 2012, pp. 286-300, vol. 22.

Ichimura, K., Photoalignment of Liquid-Crystal Systems, Chem. Rev., 2000, pp. 1847-1873, vol. 100.

Hoogboom, J., et al., Noncontact Liquid-Crystal Alignment by Supramolecular Amplification of Nanogrooves, Angew. Chem., 2003, pp. 1811-1815, Int. Ed. vol. 42.

Hoogboom, J., et al., Tunable Command Layers for Liquid Crystal Alignment, J. Am. Chem. Soc., 2005, pp. 11047-11052, vol. 127.

Morikawa, Y., et al., Optical Alignment and Patterning of Nanoscale Microdomains in a Block Copolymer Thin Film, Adv. Mater, 2006, pp. 883-886, vol. 18.

Kulikovska, O., et al., Supramolecular Azobenzene-Based Materials for Optical Generation of Microstructures, Chem. Mater., 2007, pp. 3343-3348, vol. 19.

Vretik, L.O., et al., Problem of Photoalignment in the LCD's Development: Synthetic Routes in Its Solving, Mol. Cryst. Liq. Cryst., 2008, p. 1099-1107, vol. 486.

Kim, C., et al., Effects of Dilution, Polarization Ratio, and Energy Transfer on Photoalignment of Liquid Crystals Using Coumarin-Containing Polymer Films, Macromolecules, 2008, pp. 3075-3080, vol. 41, No. 9.

Yi, Y., et al., High-Sensitivity Aminoazobenzene Chemisorbed Monolayers for Photoalignment of Liquid Crystals, Langmuir, 2009, pp. 997-1003, vol. 25.

Droge, S., et at., A new approach to photoalignment: photo-addition to a self-assembled monolayer, J. Mater. Chem., 2009, pp. 274-279, vol. 19.

Janning, J.L., Thin film surface orientation for liquid crystals, Appl. Phys. Lett., Aug. 1972, pp. 173-174, vol. 21, No. 4.

Sinha, G.P., et al., Disruption of surface-induced smectic order by periodic surface corrugations, Phys. Rev. E., 2002, pp. 041718-1-041718-4, vol. 65.

Kim, J.H., et al., Instable nematic liquid-crystal device using micropatterned surface alignment, Nature, 2002, pp. 159-162, vol. 420.

Varghese, S., et al., Patterned Alignment of Liquid Crystals by µ-Rubbing, Adv. Mater., 2004, pp. 1600-1605, vol. 18.

Guzman, O., et al., Quenched disorder in a liquid-crystal biosensor: Adsorbed nanoparticles at confining walls, J. Chem. Phys., 2005, pp. 184711-1-184711-10, vol. 122.

Koenig, G.M., et al., Coupling of the Plasmon Resonances of Chemically Functionalized Gold Nanoparticles to Local Order in Thermotropic Liquid Crystals, Chem. Mater, 2007, pp. 1053-1061, vol. 19.

Gupta, V.K., et al., Using Isotropic, Nematic, and Smectic Fluids for the Study of Self-Assembled Monolayers Formed from Alkanethiols on Gold, Chem. Mater., 1996, pp. 1366-1369, vol. 8, No. 7.

Drawhorn, R.A., et al., Anchoring of Nematic Liquid Crystals on Self-Assembled Monolayers Formed from Alkanethiols on Semi-transparent Films of Gold, J. Phys. Chem., 1995, pp. 16511-16515, vol. 99.

Wilderbeek, H.T.A., et al., Alignment of Liquid Crystals on Self-Assembled Monolayers Using Ultra-Thin Gold Films, Adv. Mater., 2002, pp. 655-658, vol. 14, No. 9.

Wilderbeek, H.T.A., et al., Patterned Alignment of Liquid Crystals on Selectively Thiol-Functionalized Photo-Orientation Layers, Adv. Mater., 2003, pp. 985-988, vol. 15, No. 12.

Evans, S.D., et al., Surface Plasmon Resonance Imaging of Liquid Crystal Anchoring on Patterned Self-Assembled Monolayers, J. Phys. Chem. B, 1997, pp. 2143-2148, vol. 101.

Kumar, A., et al., Features of gold having micrometer to centimeter dimensions can be formed through a combination of stamping with an elastomeric stamp and an alkanethiol "ink" followed by chemical etching, Appl. Phys. Letter, 1993, pp. 2002-2004, vol. 63.

Bramble, J.P., et al., Nematic liquid crystal alignment on chemical patterns, Liq. Cryst., Sep. 2007, pp. 1059-1069, vol. 34, No. 9.

Anquetil-Deck, C., et al., Nematic liquid-crystal alignment on stripe-patterned substrates, Phys. Rev. E 2010, pp. 331709-1-031709-10, 82.

Li, L. et al., Modeling and design of a tunable refractive lens based on liquid crystals, Proc. SPIE Optoelectronic Interconnects and Component Integration XI 2011, pp, 79440S1-79440S8, vol. 7944.

Bowley, C.C., et al., Variable-wavelength switchable Bragg gratings formed in polymer-dispersed liquid crystals, Appl. Phys. Letters., Jul. 2, 2001, pp. 9-11, vol. 79, No. 1.

Qi, H., et al., Multiple Alignment Modes for Nematic Liquid Crystals Doped with Alkylthiol-Capped Gold Nanoparticles, ACS Appl. Mater. Interf. 2009, pp. 1731-1738, vol. 1.

Qi, H., et al., Unprecedented Dual Alignment Mode and Freedericksz Transition in Planar Nematic Liquid Crystal Cells Doped with Gold Nanoclusters, Adv. Funct. Mater. 2008, pp. 212-221, vol. 18.

Urbanski, M., et al., Electroconvection in nematic liquid crystals via nanoparticle doping, Nanoscale 2010, pp. 1118-1121, vol. 2.

Volkman, S., et al., Ink-Jetted Silver/Copper Conductors for printed RFID applications, Mater. Res. Soc. Symp. Proc. 2004, pp. 151-156, vol. 814.

Jensen, G.C., et al., Inkjet-printed gold nanoparticle electrochemical arrays on plastic. Application to immunodetection of a cancer biomarker protein, Phys. Chem. Chem. Phys. 2011, pp. 4888-4894, vol. 13.

Delaney, Jr., J.T., et al., Inkjet printing of proteins, Soft Matter 2009, pp. 4866-4877, vol. 5.

Alino, V.J., et al., Inkjet Printing and Release of Monodisperse Liquid Crystal Droplets from Solid Surfaces, Langmuir 2012, pp. 14540-14546, vol. 28.

Feller, M., et al., Investigation of surface-induced alignment of liquid-crystal molecules by optical second-harmonic generation, Phys. Rev. A, 1991, pp. 6778-6792, vol. 43, No. 12.

Cui, Y., et al., Alignment Layers with Variable Anchoring Strengths from Polyvinyl Alcohol, J. Appl. Phys. 2012, pp. 363520-1-063520-7, vol. 111.

Durand, G., Recent advances in nematic and smectic A anchoring on amorphous solid surfaces (1), Liq. Cryst. 1993, pp. 159-168, vol. 14, Issue 1.

Yokoyama, H., et al., A novel method for determining the anchoring energy function at a nematic liquid crystal-wall interface from director distortions at high fields, J. Appl. Phys. 1985, pp. 4520-4526,. vol. 57.

Nastishin, Y., et al., Nematic polar anchoring strength measured by electric field techniques, J. Appl. Phys. 1999, pp. 4199-4213, vol. 86, No. 8.

Nie, X., et al., Polar anchoring energy measurement of vertically aligned liquid-crystal cells, J. Appl. Phys. 2005, pp. 313516-1-013516-5, vol. 98.

(56) References Cited

OTHER PUBLICATIONS

Kim, K.H., et al., Advance of PVA Technology for Multi-media Applications, SID Digest, 2003, pp. 1208-1211, vol. 34.

Son, P.K., et al., Vertical alignment of liquid crystal on a—Si O x thin film using the ion beam exposure, Appl. Phys. Letter, 2006, pp. 263512-1-263512-3, vol. 88.

Son, P.K., et al., Investigation of ion-beam-treated SiOx film surfaces for liquid crystal alignment, Surf. Interf. Analysis, 2012, pp. 763-767, vol. 44.

Kim, J.B., et al., Orientational Transition of Liquid Crystal Molecules by a Photoinduced Transformation Process into a Recovery-free Silicon Oxide Layer, Adv. Mater., 2008, pp. 3073-3078, vol. 20.

Brust, M., et al., Synthesis of Thiol-derivatised Gold Nanoparticles in a Two-phase Liquid-Liquid System, J. Chem. Soc., Chem. Comm., 1994, pp. 801-802.

Henglein, A., et al., Radiolytic Control of the Size of Colloidal Gold Nanoparticles, Langmuir, 1998, pp. 7392-7396, vol. 14, No. 26.

Henglein, A., Radiolytic Preparation of Ultrafine Colloidal Gold Particles in Aqueous Solution: Optical Spectrum, Controlled Growth, and Some Chemical Reactions, Langmuir, 1999, pp. 6738-6744, vol. 15, No. 20.

\* cited by examiner

PATTERNED LIQUID CRYSTAL ALIGNMENT USING INK-JET PRINTED NANOPARTICLES AND USE THEREOF TO PRODUCE PATTERNED, ELECTRO-OPTICALLY ADDRESSABLE DEVICES; INK-JET PRINTABLE COMPOSITIONS

FIELD OF THE INVENTION

This present invention relates to ink jet printable compositions including nanoparticles capped with a protective layer of hydrocarbon chains and a single solvent exhibiting a single evaporation rate and having a specifically defined viscosity and surface tension that result in uniform and printable alignment layers for liquid crystal materials.

Patterned liquid crystal-containing cells are also disclosed including one or more layers including the same or different nanoparticles capped with a protective layer of hydrocarbon chains printed on a surface of a substrate or even another nanoparticle-containing layer, wherein the one or more layers are printed with desirable resolution and precision, and wherein the capped nanoparticle-containing layer can be used to affect the electro-optical response of the cell adjacent the area of the layer.

Methods for producing the cells are also disclosed, including the step of printing a pattern on one or more portions of a cell surface utilizing a composition comprising the capped nanoparticles. In one embodiment, the method includes the step of simultaneously printing two or more different metal nanoparticle-containing ink compositions on a surface of a cell. An additional method includes the step of printing a second layer of capped nanoparticle-containing ink on a first nanoparticle-containing layer. Advantageously, the nanoparticle-containing inks can be printed on inflexible as well as flexible surfaces. Devices including the cells are also disclosed.

BACKGROUND OF THE INVENTION

Liquid crystals (LCs) have assumed their place as one of the most important materials of the information age. LC displays (LCDs) play a significant role in our everyday life; from handheld personal devices to professional applications and large-panel LCD TVs. LCs are liquids possessing long-range orientational ordering, lacking in most instances (phases) long-range positional ordering of the constituent molecules. In the case of the one-dimensionally ordered fluid nematic phase used in most display applications, intrinsic elastic interactions align the LC molecules along some preferred direction (director), which in most cases forms the optical axis of the material. Typically, nematic LCs are used in thin films, sandwiched between two glass substrates featuring transparent electrodes (usually indium tin oxide, ITO). These substrates are covered with so-called alignment layers, whose main role is to define the boundary conditions of the director to ensure uniform distribution of the optical axis is the entire LC thin film. These predominant boundary conditions are referred to as "homogeneous" (director lies in the plane of the thin film; usually with a small pre-tilt), "homeotropic" (director is normal to the plane of the thin film) or, less frequently, intermediate "tilted".

Alignment layers commonly feature some type of anisotropy that induces a preferred orientation for the LC director on the surface. Unidirectionally rubbed polyimides are the most widely used alignment layers, providing stable alignment of nematic and smectic LCs for various display modes. However, this method also has numerous disadvantages, such as polymer debris resulting from the rubbing with a velvet cloth (using rubbing machines) and inhomogeneous, site-dependent contrast ratios in the final display, which can only be avoided by careful monitoring of the manufacturing conditions in clean rooms, see J. van Haaren, Nature 2001, 411, 29. Ion-beam deposition or plasma bombardment of thin polymer, $SiN_x$, diamond-like carbon, or other thin films deposited on substrates are studied as well, see for example: (a) K. D. Harris, A. C. van Popta, J. C. Sit, D. J. Broer, M. J. Brett, Adv. Funct. Mater. 2008, 18, 2147; (b) Y. H. Kim, H. G. Park, B. Y. Oh, B. Y. Kim, K. K. Paek, D. S. Seo, J. Electrochem. Soc. 2008, 155, J371; (c) G. Hegde, O. Yaroshchuk, R. Kravchuk, A. Murauski, V. Chigrinov, H. S. Kwok, J. Soc. Inf. Display 2008, 16, 1075, and of these techniques, the glancing angle ion beam bombardment of diamond-like carbon used for the manufacturing of smaller LCD panels by IBM, see P. Chaudhari, J. Lacey, J. Doyle, E. Galligan, S. C. A. Lien, A. Callegari, G. Hougham, N. D. Lang, P. S. Andry, R. John, K. H. Yang, M. H. Lu, C. Cai, J. Speidell, S. Purushothaman, J. Ritsko, M. Samant, J. Stohr, Y. Nakagawa, Y. Katoh, Y. Saitoh, K. Sakai, H. Satoh, S. Odahara, H. Nakano, J. Nakagaki, Y. Shiota, Nature 2001, 411, 56.

Photoalignment and obliquely evaporated inorganic materials are alternative techniques that are utilized as well, for a recent review, see: O. Yaroshchuk, Y. Reznikov, J. Mater. Chem. 2012, 22, 286; for a review summarizing work up to 2000: K. Ichimura, Chem. Rev. 2000, 100, 1847; for representative examples, see: (a) J. Hoogboom, M. Behdani, J. A. A. W. Elemans, M. A. C. Devillers, R. de Gelder, A. E. Rowan, T. Rasing, R. J. M. Nolte, Angew. Chem., Int. Ed. 2003, 42, 1812; (b) J. Hoogboom, P. M. L. Garcia, M. B. J. Otten, J. A. A. W. Elemans, J. Sly, S. V. Lazarenko, T. Rasing, A. E. Rowan, R. J. M. Nolte, J. Am. Chem. Soc. 2005, 127, 11047; (c) Y. Morikawa, S. Nagano, K. Watanabe, K. Kamata, T. Iyoda, T. Seki, Adv. Mater. 2006, 18, 883; (d) O. Klikovska, L. M. Goldenberg, J. Stumpe, Chem. Mater. 2007, 19, 3343; (e) L. O. Vretik, V. G. Syromyatnikov, V. V. Zagniy, E. A. Savchuk, O. V. Yaroshchuk, Mol. Cryst. Liq. Cryst. 2008, 486, 1099; (f) C. Kim, J. U. Wallace, S. H. Chen, Macromolecules 2008, 41, 3075; (g) Y. Yi, M. J. Farrow, E. Korblova, D. M. Walba, T. E. Furtak, Langmuir 2009, 25, 997; (h) S. Droge, M. O'Neill, A. Lobbert, S. P. Kitney, S. M. Kelly, P. Wei, D. W. Dong, J. Mater. Chem. 2009, 19, 274; J. L. Janning, Appl. Phys. Lett. 1972, 21, 173. Although these processes have demonstrated their durability and have been implemented in large-scale production environments, they usually require many fabrication steps, high processing temperatures, and sometimes, high vacuum environment.

In addition, many LC applications require patterned alignment of the LC to provide spatial modulation of the optical axis, for example, for the wave front control applications. Usually, in order to obtain patterned alignment, complicated and expensive photolithography techniques must be used. With the use of photoalignment, the process can be significantly simplified, but still requires design and fabrication of photo-masks as well as the deposition of a photosensitive polymer layer using spin coating and baking Other approaches include micropatterning using a sharp stylus, see G. P. Sinha, C. Rosenblatt, L. V. Mirantsev, Phys. Rev. E 2002, 65, 041718; (b) J. H. Kim, M. Yoneya, H. Yokoyama, Nature 2002, 420, 159, or micro-rubbing (μ-rubbing) of polyimides S. Varghese, S. Narayanankutty, C. W. M. Bastiaansen, G. P. Crawford, D. J. Broer, Adv. Mater. 2004, 18, 1600.

Another promising technique refined by Abbott and co-workers makes use of alkylthiol self-assembled monolayers (SAMs), see O. Guzman, N. L. Abbott, J. J. de Pablo, *J. Chem. Phys.* 2005, 122, 184711; (b) G. M. Koenig, M. V. Meli, J. S. Park, J. J. de Pablo, N. L. Abbott, *Chem. Mater.* 2007, 19, 1053; (c) V. K. Gupta, W. J. Miller, C. L. Pike, N. L. Abbott, *Chem. Mater.* 1996, 8, 1366; (d) R. A. Drawhorn, N. L. Abbott, *J. Phys. Chem.* 1995, 99, 16511, either on thin gold films sputtered on glass or gold islands immobilized on surfaces via electron beam evaporation, which, depending on the chain length, combination of chain lengths, and functionalization, can induce multiple alignment scenarios in nematic LCs, see (a) H. T. A. Wilderbeek, F. J. A. van der Meer, K. Feldman, D. J. Broer, C. M. W. Bastiaansen, *Adv. Mater.* 2002, 14, 655; (b) H. T. A. Wilderbeek, J. P. Teunissen, C. W. M. Bastiaansen, D. J. Broer, *Adv. Mater.* 2003, 15, 985. Photopatterning, S. D. Evans, H. Allinson, N. Boden, T. M. Flynn, J. R. Henderson, *J. Phys. Chem. B* 1997, 101, 2143, or microcontact printing (μCP) using SAMs pioneered by Whitesides, A. Kumar, G. M. Whitesides, *Appl. Phys. Lett.* 1993, 63, 2002, also allow for patterned alignment of nematic LCs, but still require multiple fabrication steps such as etching of a silicon wafer master to prepare PDMS stamps (that can be used many times for the same pattern, but not altered), see (a) J. P. Bramble, S. D. Evans, J. R. Henderson, C. Anquetil, D. J. Cleaver, N. J. Smith, *Liq. Cryst.* 2007, 34, 1059; (b) C. Anquetil-Deck, D. Cleaver, *Phys. Rev. E* 2010, 82, 031907.

In most cases, simple processes with fewer steps lead to lower production costs and higher yields. The development of simpler processes for the patterned alignment of LCs would facilitate the development of low-cost electro-optical devices such as adaptive LC-based lenses, see L. Li, D. Shi, D. Bryant, T. van Heugten, D. Duston, P. J. Bos, *Proc. SPIE Optoelectronic Interconnects and Component Integration XI* 2011, 7944, 79440S, or adaptive Bragg diffraction gratings, see C. C. Bowley, P. A. Kossyrev, G. P. Crawford, S. Faris, *Appl. Phys. Lett.* 2001, 79, 9.

The effect of homeotropic alignment of nematic LCs via doping with a small quantity of thiol-capped gold nanoparticles (NPs) has recently been demonstrated, see H. Qi, B Kinkead, T. Hegmann, *Adv. Funct. Mater.* 2008, 18, 212; H. Qi, T. Hegmann, *ACS Appl. Mater. Interf.* 2009, 1, 1731; and M. Urbanski, B. Kinkead, H. Qi, T. Hegmann, H.-S. Kitzerow, *Nanoscale* 2010, 2, 1118. The NPs migrate and adsorb to the interface formed between the LC films and the substrate, where they induce homeotropic alignment of the director over the entire area of the cell. A similar effect is achieved if NPs are deposited onto the surface before filling of the test cell with the LC material. This leads to a uniform coverage of the surface with the NPs and, in turn, uniform vertical alignment of the LC over the entire area. The homeotropic anchoring of the LC molecules on the NPs is accompanied by a contrast inversion effect, i.e. under the action of a low-frequency electric field, "dielectrically positive" LCs ($\Delta\varepsilon > 0$, the dielectric anisotropy $\Delta\varepsilon$ is defined as $\Delta\varepsilon = \varepsilon_\| - \varepsilon_\perp$, where $\varepsilon_\|$ is the dielectric permittivity parallel to the long molecular axis and $\varepsilon_\perp$ the dielectric permittivity perpendicular to the long molecular axis) effectively act as dielectrically negative nematic LC ($\Delta\varepsilon < 0$) and undergoes a transition from the homeotropic to the homogenous state, see H. Qi, B. Kinkead, T. Hegmann, *Adv. Funct. Mater.* 2008, 18, 212. This dual-alignment capability can form the basis for numerous useful applications.

SUMMARY OF THE INVENTION

In view of the above, a problem of the present invention was to provide high precision control of nanoparticle-induced liquid crystal alignment. The indicated problem is solved by the methods of the present invention which allow patterned alignment of liquid crystals, preferably nematic liquid crystals in one embodiment, which provides a quick, simple, and highly versatile and adaptable liquid crystal alignment technique.

Accordingly, it is an object of the present invention to provide patterned structures with modulated director configuration in the liquid crystal cells utilizing ink jet printing of a composition comprising nanoparticles or nanomaterials capped with a protective layer of hydrocarbon chains (NPs), wherein the fabricated structures and patterns can be used for nanomaterial-based electronics, see for example S. Volkman, Y. Pei, D. Redinger, S. Yin, V. Subramanian, *Mater. Res. Soc. Symp. Proc.* 2004, 814, I7.81 and G. C. Jensen, C. E. Krause, G. A. Sotzing, J. F. Rusling, *Phys. Chem. Chem. Phys.* 2011, 13, 4888, biomaterials, see J. T. Delaney, J. P. Smith Jr., U. S. Schubert, *Soft Matter* 2009, 5, 4866, and liquid crystal displays, see V. J. Alino, K. X. Tay, S. A. Khan, K.-L. Yang, *Langmuir* 2012, 28, 14540. Striking and advantageous features of the ink jet printing process are the variability of the NPs (metal, metal chalcogenide, carbon-based, etc.), wide choice of substrates and patterns as well as the scalability and simplicity of the process.

Still another object of the present invention is to provide electro-optical liquid crystal-containing devices, some having relatively low cost, such as, but not limited to adapted liquid crystal Fresnel lenses, Bragg diffraction gratings, LCDs working in the vertical alignment mode with a patterned pixel design, flexible LCD and liquid crystal sensors.

Yet another object of the present invention is to provide an ink-jet printable composition, comprising a nanoparticle capped with a protective layer of hydrocarbon chains, wherein the nanoparticle comprises a metallic, metal oxide, metal chalcogenide, or carbon-based core; and a single solvent component having a defined viscosity and surface tension that provides a single evaporation rate and results in a uniform and printable alignment layer. In one embodiment the solvent has a viscosity of 7 to 15 cPs and a surface tension of from about 20 to about 50 dynes/cm. O-xylene is one example of a suitable solvent.

Still another object of the present invention is to provide a liquid crystal device having one or more same or different capped nanoparticle-containing layers printed on a surface of a substrate or even another capped nanoparticle-containing layer, wherein the one or more layers can be printed with desirable resolution and precision.

Accordingly, one aspect of the invention is an ink jet printable composition, comprising a nanoparticle capped with a protective layer of hydrocarbon chains; and a single solvent having a viscosity of about 7 to about 15 cPs and a surface tension of about 20 to about 50 dynes/cm.

In another aspect of the invention, a method for forming a liquid crystal cell is disclosed, comprising the steps of obtaining a capped nanoparticle-containing composition comprising a) a nanoparticle capped with a protective layer of hydrocarbon chains and b) a solvent; and printing a first layer of the composition on one or more portions of a cell surface with an ink-jet printer.

In a further aspect of the invention, a printed, patterned liquid crystal device is disclosed, comprising at least two substantially transparent substrates; a substantially transparent conductive electrode layer operatively connected to each substrate; optionally an alignment layer located on at least one of the conductive electrode layers; a printed layer located on a portion of one or more of the electrode layer and the alignment layer, and the printed layer derived from a composition comprising a nanoparticle capped with a protective layer of hydrocarbon chain and a solvent, wherein an electro-active liquid crystal material is present between the at least two substantially transparent substrates and is in contact at least the printed layer.

DETAILED DESCRIPTION OF THE INVENTION

Figure 1:
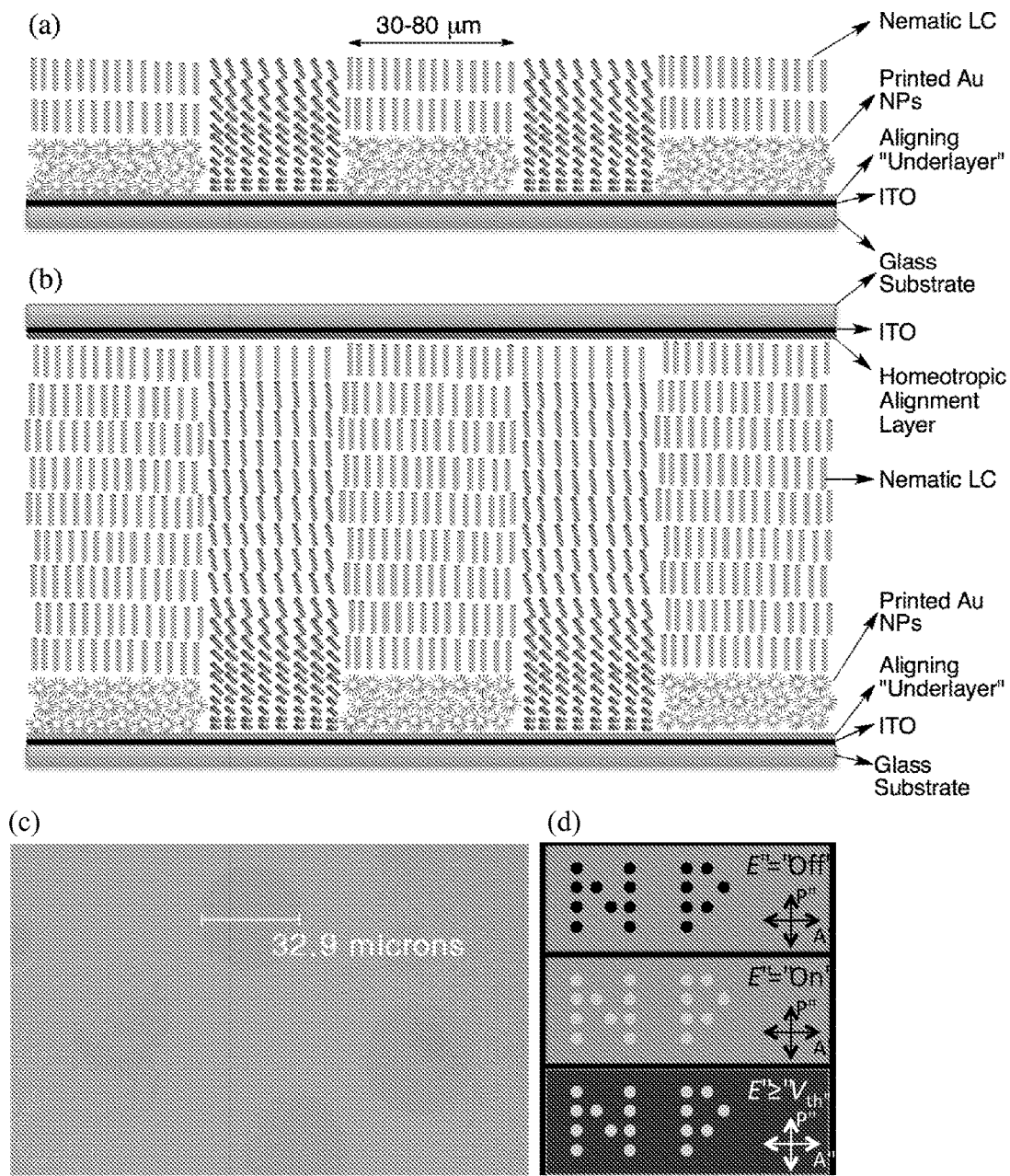
FIG. 1 shows (a) schematic image of the substrate design of an LC cell with ITO electrodes and alignment layers (continuous layer of 30° $SiO_x$ and multiple, separate, patterned printed layers of gold NPs); (b) schematic image of the hybrid structure of the cell with NPs printed on one of the surfaces featuring a homogeneous alignment layer (bottom), and a second surface with a homeotropic alignment layer (NP induced homeotropic—hybrid patterning), wherein the rubbing direction or easy axis of orientation of the $SiO_x$ alignment "underlayer" determine the direction of planar alignment in the non-printed domains in (a) and (b); (c) spherical pixels (droplets) printed using gold NPs (bright field micrograph), and (d) possible alignment/electro-optic pattern (homeotropic pixels in planar cell and vice versa using applied electric fields)

As described herein above, ink jet printing of compositions including capped nanoparticles having a protective layer of hydrocarbon chains and a solvent is disclosed as a versatile and highly efficient means to pattern the alignment of liquid crystals, preferably nematic liquid crystals in one embodiment. Any homeotropic alignment patterns can be created quickly, for example ranging in size from 30 micron (850 dpi) to several inches$^2$, with high accuracy that does not deteriorate with time. Depending upon the alignment underlayer, intermediate configurations between homeotropic and homogeneous are also producible. In one embodiment nematic liquid crystals with both positive and negative dielectric anisotropy can be switched by applying a DC or AC electric field in the printed vertical domains with the substrate configuration determining the electro-optic response.

Many liquid crystal-based electro-optical devices such as diffraction gratings, Fresnel zone plates, adaptive lenses, or sensors require patterned alignment surfaces. Typically such devices are fabricated using complicated techniques such as photolithography or photo-alignment. While these methods provide good resolutions and predictable results, they are time consuming, and the patterning surfaces do not actively influence the electro-optical response of the liquid crystal. In addition, there are limitations regarding the types of substrates that can be used.

Printable Ink Compositions

The ink jet printable compositions of the present invention have to conform to the requirements of Piezo-based nozzles of the printer cartridges requiring specific viscosities and surface tension. For example, in one embodiment the compositions include a single solvent that provides a viscosity in a range generally of about 7 to about 15 cPs and preferably from about 10 to about 12 cPs. The solvent has a surface tension in a range generally from about 20 to about 50 dynes/cm and preferably from about 28 to about 42 dynes/cm.

The capped nanoparticles should not aggregate substantially in the composition and the carrier fluid or solvent should have a boiling point under mild vacuum lower than 100° C. as well as sufficiently high vapor pressure to allow evaporation of the solvent without any substantial decomposition of the nanoparticles. Thus, it should be clear that after printing the ink-jet-printable compositions of the present invention, the printed layer derived from the composition comprising the capped nanoparticle and solvent is free of or substantially free of the solvent due to solvent evaporation.

In view of the above, in one embodiment the solvent is o-xylene. Multi-solvent systems induce aggregation of the nanoparticles on the printed substrate during solvent evaporation, since one solvent usually displays a higher vapor pressure (or boiling point). Additionally, aggregation is seen because the nanoparticles show a different solubility in the solvents making up the multi-solvent carrier fluid.

When deposited or fixed on a cell substrate, for example an electrode layer or alignment layer, the deposited nanoparticles capped with a protective layer of hydrocarbon chains are used to affect the alignment of the liquid crystal of the cell adjacent to the deposited capped nanoparticle-containing layer. Suitable nanoparticles include, or comprise a metallic, metal oxide, metal chalcogenide, or carbon-based core. In one embodiment, an ink jet printable composition and layers and/or layer printed therewith comprises one or more of a nanoparticle comprising a metallic core, a nanoparticle containing a metal oxide core, a nanoparticle containing a metal chalcogenide core and a nanoparticle containing a carbon-based core.

The metal of the metal core-containing nanoparticle may be, for example, gold, silver, platinum, or palladium. In a preferred embodiment, the metal is gold. Functionality is provided to the metal core-containing nanoparticles by bonding functional groups to the metal. A functional group such as a chiral group may be bonded to the metal through any one of a variety of linkages, for example a thiol linkage, a bis-thiol linkage, a thiosulfate linkage, a phosphorus linkage, a silane linkage, a siloxane linkage, or a carboxylate group. The chiral group may be any group having one or more chiral centers. For example, the chiral group may be a chiral ester such as 6-sulfanylhexyl (2S)-(6-methoxy-2-naphthyl)propanoate, 12-sulfanyldodecyl (2S)-(6-methoxy-2-naphthyl)propanoate, (2S)-methylbutyl 7-sulfanylheptanoate, or an enantiomer thereof or any other chiral dopant structure known to induce a chiral nematic liquid crystal phase. Various metal core-containing nanoparticles are described for example in U.S. Pat. No. 8,071,181 and U.S. Pat. No. 8,294,838 and herein incorporated by reference.

The nanoparticles comprising a metal chalcogenide core that are utilized in some embodiments to form a ink jet printable composition and a printed layer include semiconductor quantum dots or rods. A "quantum dot" is a semiconductor nanoparticle that can confine the motion of electrode or holes in all three spatial directions. A "quantum rod" or "nanorod" is a semiconductor nanoparticle in the form of a rod. Quantum dots and rods may be made by, for example, colloidal synthesis, electrochemical techniques, or pyrolytic synthesis. "Nanocluster" and "nanoparticle", as used herein, are synonymous and include, but are not limited to, quantum dots (e.g. CdTe and CdSe quantum dots and quantum rods). Various nanoparticles comprising a metal chalcogenide core are disclosed in U.S. Pat. No. 8,323,755, herein incorporated by reference.

The carbon-based nanoparticles that are utilized in some embodiments of ink jet printable compositions and layers printed therewith include, but are not limited to, carbon dots, graphene dots, and carbon nanotubes.

The average size, herein the largest dimension of a capped nanoparticle, for example a diameter of a sphere, is no greater than 10 or 25 nanometers (nm). In one embodiment the capped nanoparticle average size ranges from about 1 to about 10 or 25 nm. In other embodiments, the average size is from 1 to 9 nm, 1 to 8 nm, 1 to 7 nm, 1 to 6 nm, 1 to 5 nm, 1 to 4 nm, 1 to 3 nm, or 1 to 2 nm. Unless otherwise noted herein, the average size of the capped nanoparticles provided is the average size of the core, for example a gold core, silver core, or CdTe core, of the capped nanoparticle, wherein the measurement of size does not include the functionality attached to the core. The average size of the nanoparticle can be measured using techniques that utilize, for example, x-ray scattering and/or transmission electron microscopy.

The capped nanoparticles of the printable composition are present in an amount that does not substantially affect the viscosity of the solvent on one hand and also to provide for desired alignment characteristics on the other hand. That said, the concentration of the capped nanoparticles in the solvent ranges generally from about 10 to about 100 mg/ml, desirably from about 10 to about 75 mg/ml, and preferably from about 15 to about 50 mg/ml. In one embodiment the capped nanoparticles are present in a concentration that provides at least a monolayer surface coverage on a desired surface of the cell to which the printable composition is applied.

The printable composition is formed in one embodiment by combining the components to form a solution, generally by mixing or dispersing the nanoparticles capped with a protective layer of hydrocarbon chain in the solvent. In one embodiment the solution is sonicated, for example in an ultrasonic water bath for a suitable period of time, for example one minute, before filling a printing cartridge therewith.

Patterned Liquid Crystal Cells and Devices

The liquid crystal cells of the present invention include a pair of substrates, see FIG. 1(b) for example. In one embodiment, the pair of substrates is substantially planar and disposed substantially parallel to each other. The substrates are maintained at a desired distance by spacers in various embodiments. The spacing range can vary, and in one embodiment ranges from about 1 to about 15 microns, desirably from about 3 to about 10 microns, and preferably from about 4 to about 7 microns. An electrode layer is present on each inner surface of the cell substrates. In some embodiments, one or more patterned electrode layers are utilized.

If desired, an alignment layer is present on one or more portions of an electrode layer. In one embodiment an alignment layer is present on an electrode layer of one cell substrate. In a further embodiment, an alignment layer is present on each electrode layer of each cell substrate.

The printed, capped nanoparticle-containing composition layer is present on one or more portions of a cell surface. For example, the printed layer can be printed directly on the electrode layer or an alignment layer when present, or both, depending upon the cell construction. In some embodiments each of a portion of an alignment layer and a printed capped nanoparticle-containing composition layer are in contact with an electrode layer. As noted herein, in view of the ability of the capped nanoparticle-containing printable composition to be applied to the desired cell surface with high precision, precise patterns can be formed. In addition, a plurality of different printable compositions each containing a different type of nanoparticle can be applied to a cell surface, resulting in multiple patterns comprising different nanoparticles.

Furthermore, in various embodiments, a second layer of a printable capped nanoparticle-containing composition containing a same or different nanoparticle can be printed over a first layer printed on a cell surface. Multiple stacked layers of a printed, capped nanoparticle-containing composition can be utilized to affect the alignment of the liquid crystal mixture utilized in the cell. Thus, one can tune the pre-tilt angle of the liquid crystal. In some embodiments, the pre-tilt of the liquid crystal can be overridden by printing multiple layers of the printable nanoparticle-containing composition over one another. In various embodiments, the printed composition can be present on a portion of each substrate, for example one or more of an electrode layer and/or alignment layer of a lower substrate and one or more of an electrode layer and/or alignment layer of an upper substrate.

As various printers have two or more different ink-jet nozzles, two or more different nanoparticle-containing printable compositions can be printed simultaneously which allows for rapid cell construction.

A liquid crystal layer is present between the substrates and in contact with at least the printed capped nanoparticle-containing composition and further an alignment layer when present and not covered by a printed layer. As utilized herein, the term "layer" does not require a uniform thickness, and imperfections or uneven thicknesses can be present so long as the layer performs its intended purpose.

The substrates utilized in the present invention must provide desired optical transmission and preferably are transparent. The substrates can be planer or curved. Furthermore, in some embodiments the substrates are flexible. Various materials can be utilized as known in the art, such as, but not limited to, glass, quartz, or a polymer. Glass is preferred in an embodiment where flexibility is not required. In some embodiments, the substrate is a non-birefringent material, or aligned and compensated to minimalize the effect of the birefringence.

The conductive electrode layer can be deposited on a substrate by any known method. The electrode layer material can be any inorganic, substantially transparent conductive material. Examples of suitable materials include, but are not limited to, a metal oxide such as indium oxide, tin oxide, and indium tin oxide, and preferably are indium tin oxide in one embodiment. The electrode layer must be sufficiently thick to provide desired conductivity. That said, the thickness of the conductive electrode layer ranges generally from about 5 to about 250 nm.

When present, the alignment layer is used to induce a particular directional orientation in the liquid crystal when no voltage is applied to the cell. Various materials suitable for use as alignment layers are known in the art. For example, alignment layers include, but are not limited to, polyimide, polyvinyl alcohol, and 30° $SiO_x$. The thickness of the alignment layer should be sufficient to impart the desired directional orientation to the liquid crystal material. In some embodiments, the alignment layer has a thickness that ranges generally from about 50 to about 500 nm. In some embodiments, the alignment layer can be treated by rubbing to impart a substantially homogeneous molecular orientation to the liquid crystal material prior to an electric field being applied to the cell.

Generally any liquid crystal material that has an orientational order that can be controlled in the presence of an electric field can be utilized. In various embodiments, nematic, smectic, or cholesteric phase forming liquid crystals or polymer-containing liquid crystals such as polymer liquid crystals, polymer dispersed liquid crystals, or polymer stabilized liquid crystals can be utilized. Nematic liquid crystals are preferred in one embodiment. The nematic liquid crystals may have positive dielectric anisotropy, $\Delta\varepsilon>0$ or negative dielectric anisotropy, $\Delta\varepsilon<O$. Non-limiting examples of suitable nematic liquid crystals include, but are not limited to, cyanobiphenyl derivatives such as Felix-2900-3, 4'-n-pentyl-4-cyanobiphenyl (5CB), 4'-n-octyl-4-cyanobiphenyl (8CB), or 4'-n-octyloxy-4-cyanobiphenyl (8OCB).

While the homeotropic anchoring of the LC molecules on the NPs defines the director orientation in the vicinity of the NPs, in the "blank" areas (non-printed) of the cell without NPs, the director orientation depends on the exposed surface of the substrate. Hence, to achieve controlled director configuration over the entire thin LC film, one needs to define the boundary conditions for the director everywhere, including the blank (non-patterned) areas. The simplest solution would be to first deposit an alignment layer on the desired portions or areas of the electrode layer and then print the NPs directly atop, ensuring that the alignment layer underneath the particles does not disrupt the homeotropic alignment induced by the NPs themselves. To create the maximum amplitude of the optical axis modulation in the cell, the alignment "under-layer" needs to provide homogeneous alignment of the LC.

As the "under-layer", we tested the performance of several standard alignment layer materials with varying polar anchoring energies such as polyimide PI-2555 (anchoring energy ~1 $mJ/m^2$, see M. Feller, W. Chen, Y. Shen, Phys. Rev. A 1991, 43, 6778.1), polyvinyl alcohol (anchoring energy ~$10^{-1}$ $mJ/m^2$, see Y. Cui, R. S. Zola, Y.-C. Yang, D.-K. Yang, J. Appl. Phys. 2012, 111, 063520), and $SiO_x$ films evaporated at 30° with respect to the evaporation direction, which provides zero pre-tilt alignment with the low anchoring energy of ~$10^{-2}$ $mJ/m^2$, see G. Durand, *Liq. Cryst.* 1993, 14, 159.

The homogeneous alignment layers of PI-2555 and PVA were deposited using the standard process (spin-coating of the solution, evaporating of the solvent, and baking) The 30° $SiO_x$ was deposited onto the pre-cleaned ITO-covered glass substrates. The quality of homogeneous alignment was tested by assembling a test cell made of two alignment layer surfaces and filling it with one of the used LCs, here Felix-2900-03 (for phase transition temperatures and other properties of all LCs used and tested, see Table 1). The proposed design of the substrate of the LC cell is shown in FIG. 1*a*.

TABLE 1

List and properties of used LCs and LC mixtures.

| LC | Transition temperatures/° C. Phase sequence | EO Properties |
|---|---|---|
| Felix-2900-03 | Cr 52 (SmA 45) N 70 Iso | Δε = +0.62 (at $T/T_{Iso/N}$ = 0.95) |
| 5CB | Cr 25 N 35 Iso | Δε = +14.2, Δn = 0.1973 |
| MLC-6610 | $T_{Iso/N}$ = 79 | Δε = −3.1, Δn = ~0.07 |
| TL203 | $T_{Iso/N}$ = 74.6 | Δε = +11.0, Δn = 0.2013 |

To define the director across the entire cell, the boundary conditions must also be set at the other surface. One possibility is assembling a LC cell using two identical substrates with printed NPs. In this case, an additional step of aligning the patterns on the two substrates is needed. To eliminate this additional step, using a solid homeotropic alignment layer on the second substrate would lead to homeotropic director configuration over the printed areas and a hybrid configuration over the non-printed areas (FIG. 1b). Although such configuration does not lead to the maximum possible amplitude of the optical axis direction, this approach provides the simplest production process with the elimination of the afore-mentioned pattern alignment step. It is important to induce a small pre-tilt to the homeotropic alignment layer to avoid director configuration degeneracy and prevent domains of the different molecular orientation from forming in the cell. To realize this, an alignment layer such as the homeotropic polyimide alignment layer SE-1211 was deposited on pre-cleaned ITO-coated glass substrates for the second (top) substrate intended to be used for the hybrid cells. A solution of SE-1211 (Solvent type 26 from Nissan Chemicals, concentration 1:2) was spin-coated at 5000 rpm for 30 seconds, pre-baked at 80° C. for 5 minutes, and baked at 210° C. for 45 minutes. After baking, the substrates were unidirectionally rubbed to induce a pre-tilt of ~5° with respect to the cell's plane normal (and the quality of the homeotropic alignment was checked by assembling a test cell made of two such substrates covered with SE-1211 and again observing the alignment of Felix-2900-03).

To demonstrate the versatility of this approach, we also printed NPs on bare ITO surfaces to show that patterned NP-induced LC alignment without the use of any alignment "under-layer" can be realized as well. In this case, the NPs were only printed either only on one or both of the surfaces.

The size of the printed droplet ("pixel" size) depends on the volume of the droplet (defined by the cartridge, for most experiments we used 10 pL) and the substrate. In the case of $SiO_x$, the resulting droplet size is around 75 μm (~340 dpi resolution), see The droplet or pixel size depends on the wettability of the substrate, e.g., 75 μm on $SiO_x$ vs. 70 μm on pre-cleaned glass, respectively, for a 10 pL droplet. Using a cartridge with a droplet volume of 1 pL results in the pixel size around 30 μm (~850 dpi resolution) as shown in FIG. 1c, but since alignment and unique electro-optic response (FIG. 1d), see H. Qi, B. Kinkead, T. Hegmann, Adv. Funct. Mater. 2008, 18, 212 and M. Urbanski, B. Kinkead, H. Qi, T. Hegmann, H.-S. Kitzerow, Nanoscale 2010, 2, 1118, are independent of pixel size we will discuss the results for the 10 pL cartridges. To achieve homogeneous features (pixels) we made use of the precision overprinting feature of the printer, where the same pattern can be precisely printed a second time over an existing pattern (i.e. about four to six layers of NPs). Using this approach, the designed printed patterns had the droplet spacing of 75 μm corresponding to the pixel size. Various printing patterns were designed using bitmap graphic editor and imported as 1-bit bitmap files into the printer software. The one-nozzle printing mode was used for the slower but more consistent printing, but multi-nozzle printing could be used as well as noted herein. After printing, the substrates were placed in the vacuum oven for several hours at 35-40° C. to ensure complete evaporation of the solvent (o-xylene). The thickness of dried printed layer was determined by FIB-SEM.

From the SEM image (FIG. S7), the average thickness of the dual layer overprinted NP pixel was determined to be ~28 nm (see experimental section for more details). This was found to be in excellent agreement with theoretical estimations, which gave the layer thickness of 29.5 nm for the double layer (for a printed droplet 70 μm in diameter). The various cells were assembled with either only one or both substrates featuring printed NP patterns. Spherical silica spacers sprayed over one of the substrates controlled the cell gap to 5±0.2 μm. The cells were filled with the LC using the vacuum chamber (because the capillary method for the 5 μm gap sometimes led to the appearance of air bubbles in the cell). The printed patterns were stable under these filling conditions and did not smear out.

The quality of LC alignment in the test cells with printed NPs on the various surfaces was visually assessed using polarized light optical microscopy in the nematic phase of the LC. For Felix-2900-03, the observation temperature was typically a few degrees below the nematic-isotropic transition temperature (~70° C.), for the room-temperature nematic LCs (5CB, MLC-6610, and TL203), all experiments were performed at room temperature.

To characterize the aligning properties of the NPs, we measured the polar anchoring energy using Yokoyama-van Sprang method, see H. Yokoyama, H. A. van Sprang, J. Appl. Phys. 1985, 57, 4520, enhanced by Lavrentovich and co-workers, see Y. Nastishin, R. Polak, S. Shiyanovskii, V. Bodnar, and O. Lavrentovich J. Appl. Phys. 1999, 86, 4199, and expanded to the homeotropic case by Wu et al., see X. Nie, Y. H. Lin, T. X. Wu, H. Wang, Z. Ge, S. T. Wu, J. Appl. Phys. 2005, 98, 013516, which is based on the measurement of optical phase retardation as a function of applied voltage. We obtained a value of $6.8 \times 10^{-4} J/m^2$ (FIG. S8, SI), which is, remarkably, of the same order of magnitude as reported for some commercially available nematic LC mixtures on homeotropic polyimide alignment layers, see Y. Nastishin, R. Polak, S. Shiyanovskii, V. Bodnar, and O. Lavrentovich J. Appl. Phys. 1999, 86, 4199 and X. Nie, Y. H. Lin, T. X. Wu, H. Wang, Z. Ge, S. T. Wu, J. Appl. Phys. 2005, 98, 013516. The details of this measurement are included in the SI.

Figure 2:
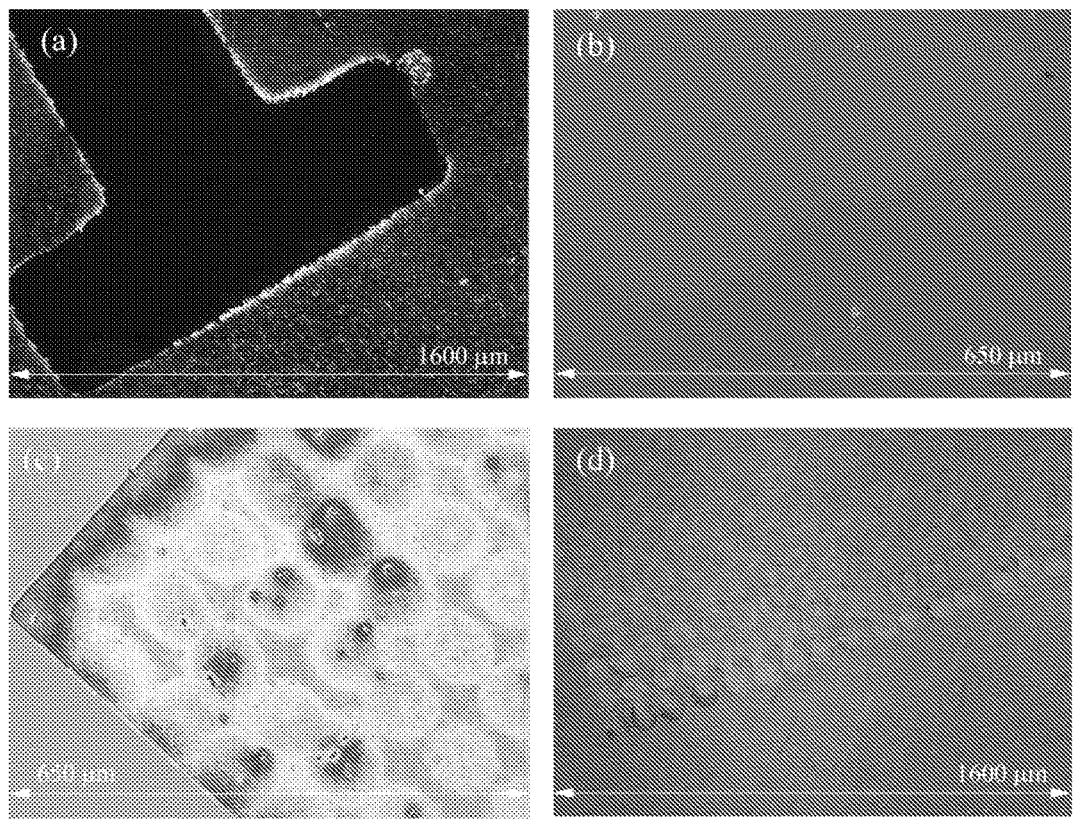
FIG. 2 shows LC textures and alignment patterns in cells (cell gap: 5 μm) created by printed NPs in the polarized light microscope (crossed polarizers): (a) MLC-6610 on bare ITO (top and bottom substrate); (b) MLC-6610 on the rubbed polyimide PI-2555—homogeneous alignment; (c) MLC-6610 on rubbed polyimide PI-2555—distorted (tilted) alignment; (d) 5CB on rubbed polyvinyl alcohol, wherein in all cells, two identical surface alignment layers are used, and the NPs are only printed on only portions of one of the substrates.

The nematic texture of the cell without alignment layers (ITO only) with the NPs printed on one of the surfaces is shown in FIG. 2a. The LC used here is MLC-6610 with a negative Δε. One can see high quality homeotropically aligned features with sharp edges surrounded by a Schlieren texture in the non-printed areas, which is expected of the ITO surface. It is clear that the absence of NPs on the one of the surfaces does not prevent the induction of homeotropic alignment. We nevertheless tested printing NPs on both surfaces. After aligning the two printed features (substrates), high-quality homeotropic alignment was observed in the printed areas, regardless of the LC used.

Printing NPs on a planar polyimide PI-2555 layer leads to the homogeneous alignment of the LC along the rubbing direction of the polyimide (FIG. 2b). One can see traces of the printed NP droplets in the homogeneous LC texture. In some cases, however, the printed NP droplets led to the distorted director configuration that showed as the high contrast imprint when observed in the polarized light optical microscope (FIG. 2c). The same effect was also observed for all other tested LCs. Using of another polymer alignment layer such as PVA gave similar results (FIG. 2d).

Figure 3:
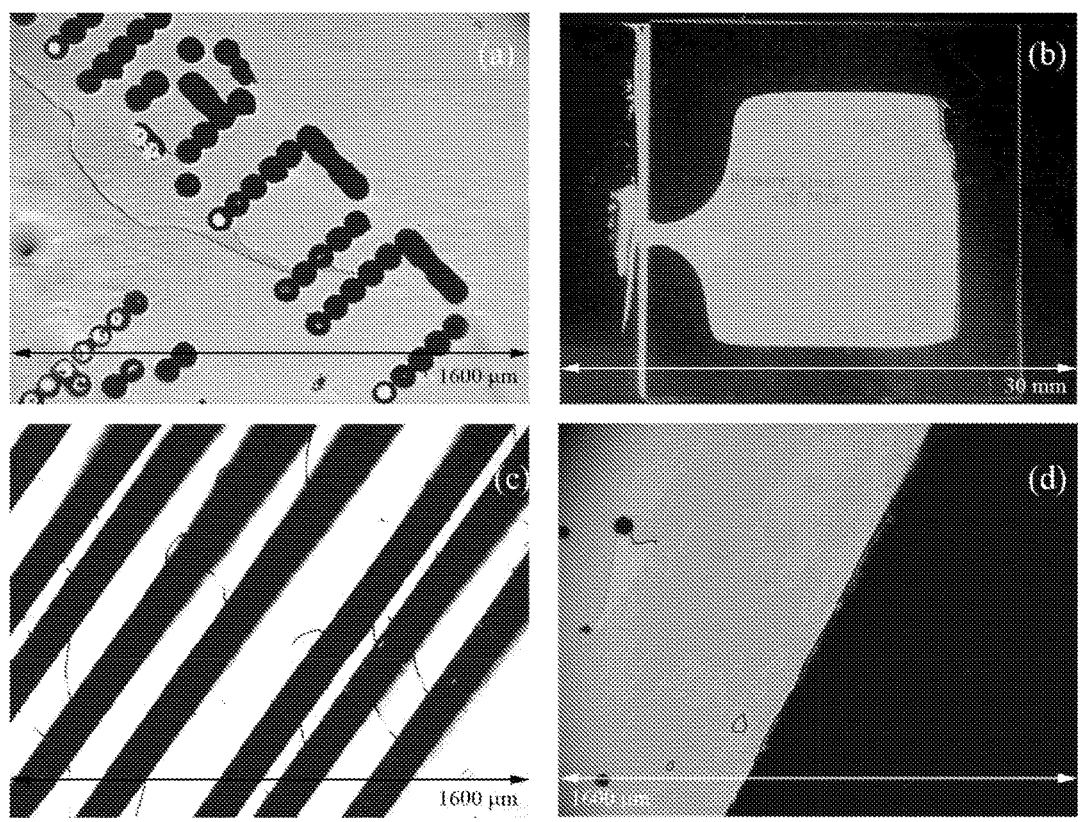
FIG. 3 shows LC texture and alignment patterns of MLC-6610 in cells (cell gap: 5um) with the NPs printed on the surface of 30° $SiO_x$ observed in polarized light optical microscope (crossed polarizers): (a) alpha-numerical pattern; (b) alphanumerical pattern (entire cell); (c) linear pattern; (d) large-feature, square pattern, wherein the opposite surface of these cells is covered with rubbed homeotropic polyimide SE-1211.

Assuming that the anchoring of the LC to the polymer alignment layer was overwhelming the LC-NP anchoring, we tested the alignment layer with the lower anchoring energy—$SiO_x$ evaporated at 30° (FIG. 3). In this case, we were able to obtain excellent contrast, patterned alignment films with high-quality homeotropic and homogeneous director configurations over the entire nematic phase range of each LC tested. We were able to print any arbitrary patterns (FIG. 3a, b), but the best quality pattern is obtained in the case of printing lines that are aligned across the movement of the printing head (FIG. 3c). FIG. 3d demonstrates the uniformity of the homeotropic alignment in the case of some of the larger printed features.

We have previously reported that thiol-capped gold NPs doped into a nematic LC matrix or deposited on the LC cell surface induce homeotropic alignment that may change to a homogeneous (planar) configuration under the action of an applied low-frequency electric field or DC electric field; effectively making the LC material with a positive dielectric anisotropy act like one with the negative dielectric anisotropy as a result of the formation of electro-hydrodynamic instabilities (convection rolls), see H. Qi, B. Kinkead, T. Hegmann, Adv. Funct. Mater. 2008, 18, 212, H. Qi, T. Hegmann, ACS Appl. Mater. Interf. 2009, 1, 1731. and M. Urbanski, B. Kinkead, H. Qi, T. Hegmann, H.-S. Kitzerow, Nanoscale 2010, 2, 1118.

Figure 4:
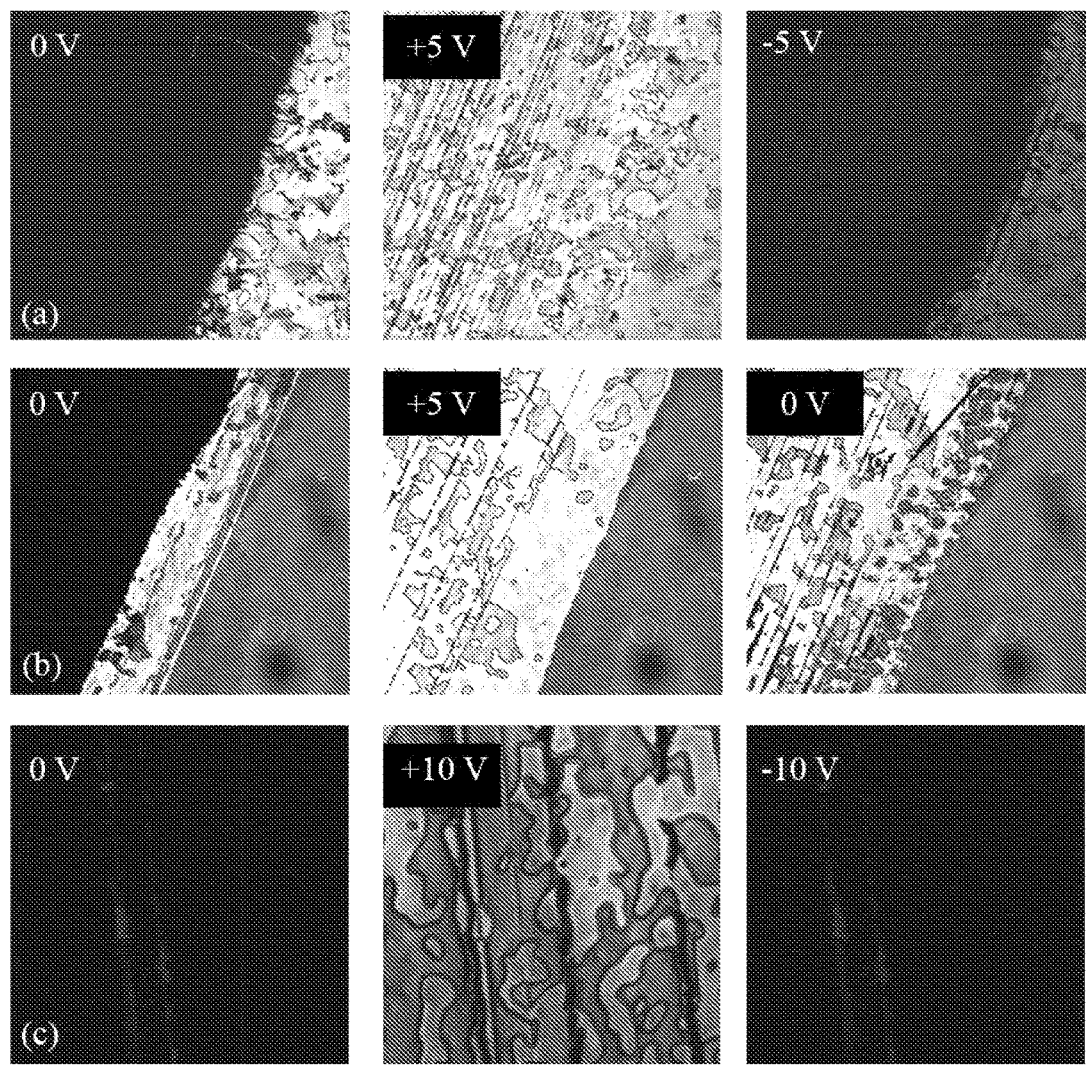
FIG. 4 shows Electro-optic response of the LC cells under an applied DC electric field; LC material: Felix-2900-03; NPs printed on the various surfaces: (a) Substrate 1: ITO+ 30° $SiO_x$+printed NPs, Substrate 2: ITO+PI-1211 substrate; (b) two ITO+30° $SiO_x$+printed NPs substrates; (c) Substrate 1: ITO+30° $SiO_x$+printed NPs, Substrate 2: ITO+PI-1211+ printed NPs.

We demonstrated that the LC cells with the printed NPs display this dual alignment mode as well, if the boundary conditions are chosen correctly. For these experiments, some of the cells were filled with the Felix-2900-03 material (used previously) and driven by a DC electric field (FIG. 4). We found that the effect depends on the surface alignment layer underneath the printed NPs as well as on surface of the other substrate.

The cell in FIG. 4a features one substrate coated subsequently with ITO, 30° $SiO_x$, and printed NPs and a second substrate with ITO and PI-1211 (as detailed above), and showed an asymmetrical dielectric response, depending on the polarity of the electric field, and an imperfect parallel director configuration in the "field-on"-state. A negative DC-field returns the cell into the homeotropic state. Switching the field off also returns the cell to the homeotropic state. The cell in FIG. 4b is made of two identical substrates (ITO+30° $SiO_x$+printed NPs). This particular configuration sometimes shows an irreversible switching effect. After the application of a positive DC-field the homeotropic-parallel configuration transition occurs, but switching the field OFF does not return the cell in the initial homeotropic state, which appears to support the involvement of convection rolls (accumulated charges on the NPs) in this process. Printing NPs on both surfaces (FIG. 4c and S10) eliminates this irreversibility, and these cells recover the homeotropic alignment after a positive or negative DC voltage is applied and turned OFF. Particularly relevant for display applications based on the vertical alignment mode (VA mode), the nematic mixture with $\Delta\varepsilon<0$ (MLC-6610; $\Delta\varepsilon=-3$) can be switched with both an AC (1 kHz) or DC applied electric field, and shows no irreversibility (see FIG. S11, SI).

Overall, as noted above it was found that the most important aspect of the NP printing process is ink formulation. Material ink jet printers, i.e. their piezo-based cartridges, are very sensitive to the rheological properties of the ink. If either viscosity or surface tension is out of the manufacturer's recommended range, it becomes extremely difficult to print with acceptable precision.

Figure 5:
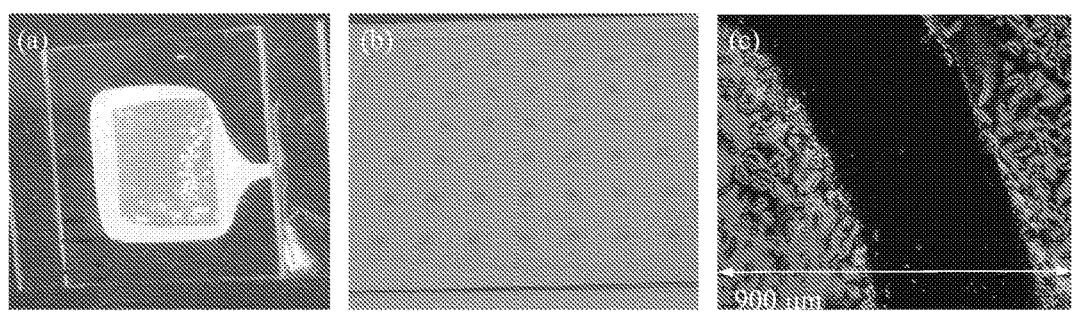
FIG. 5 shows (a) Hybrid cell filled with 5CB (bottom substrate: rubbed polyimide PI-2555+printed NPs on glass, top substrate: ITO on glass) showing NP printed domain with different pre-tilt (red arrow shows rubbing direction of PI-2555 substrate); (b) a 6 by 7 array of cells on a 7×7 inch glass wafer with square printed NP alignment patterns; (c) magnified section of the letter "C" printed with NPs on an ITO-coated glass substrate cell (top and bottom) showing the quality of the homeotropic alignment (contrast) and the sharp boundary to the homogeneous aligned domains (LC: TL203)
Figure 6:
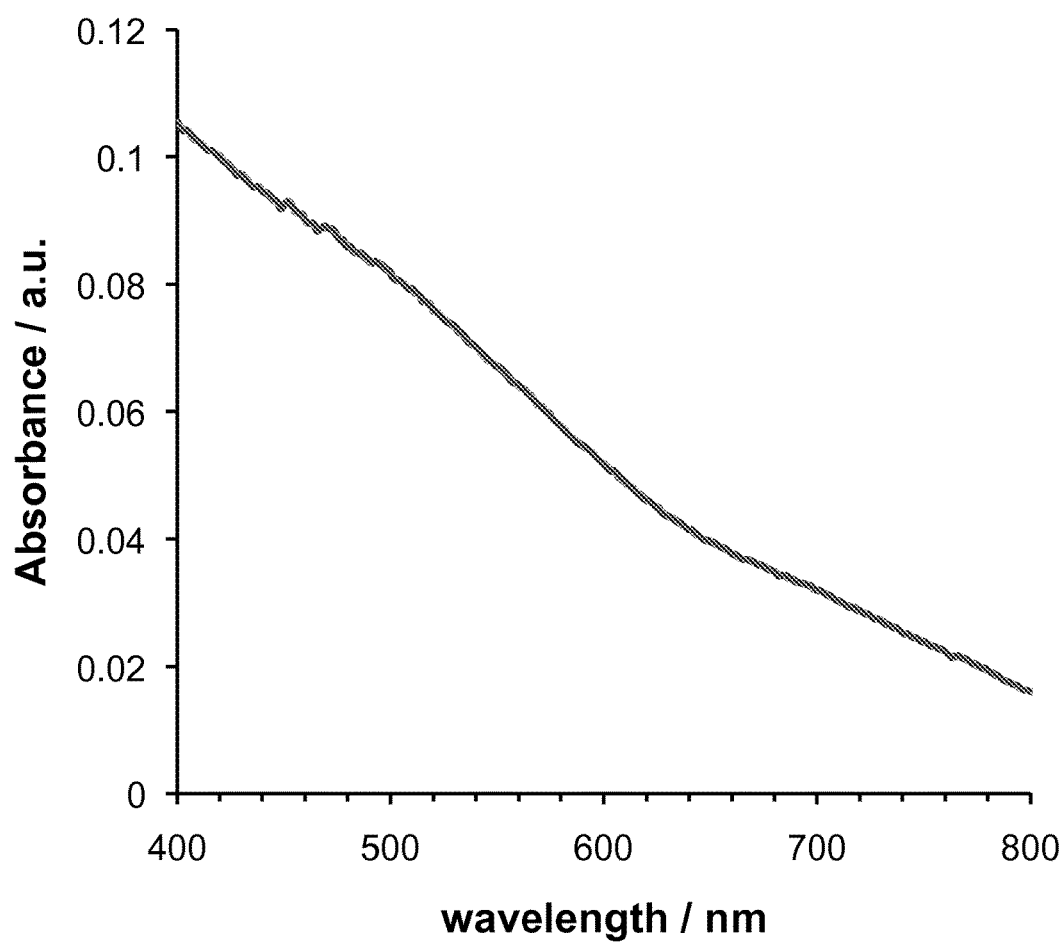
FIG. 6 shows UV-vis spectrum of the dodecanethiolate-capped Au NPs.
Figure 7:
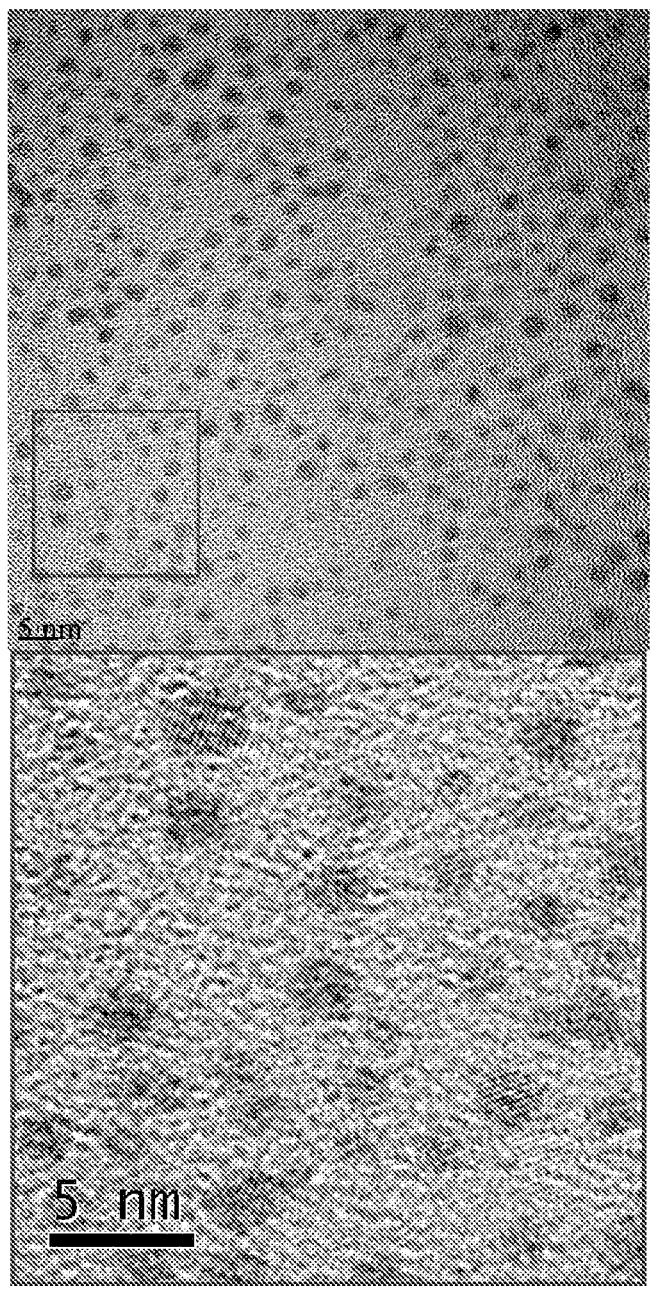
FIG. 7 shows TEM micrographs of the dodecanethiolate-capped Au NPs. Average NP size: 1.9±0.4 nm (from TEM image analysis using ImageJ of more than 100 particles)
Figure 8:
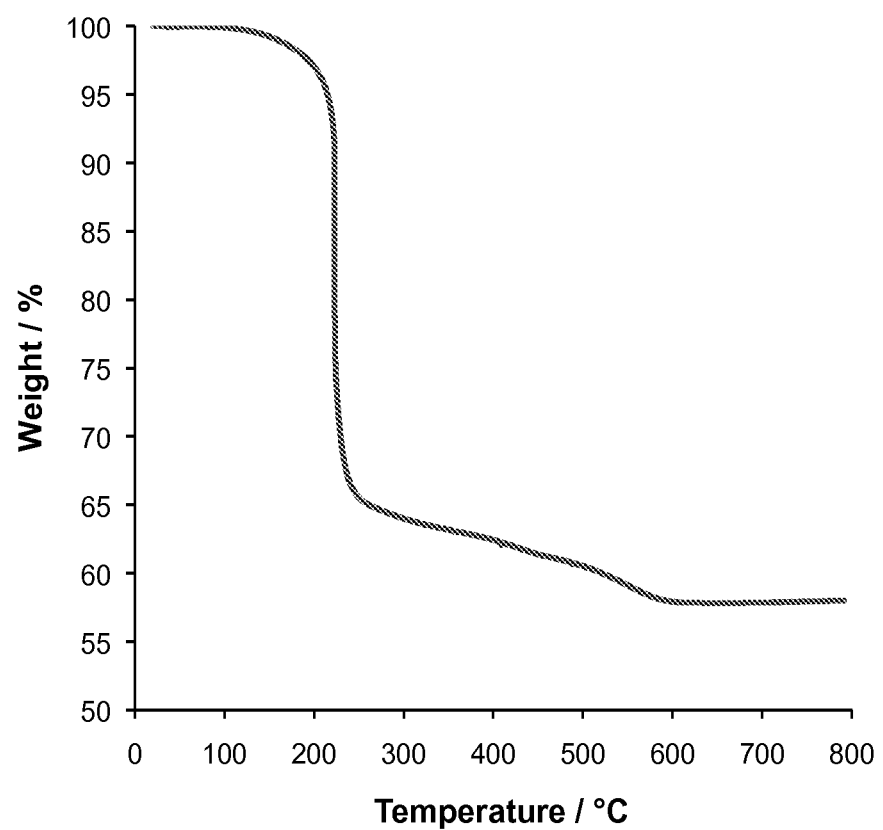
FIG. 8 shows TGA thermogram of the dodecanethiolate-capped Au NPs showing an onset of weight loss at 140° C. as reported by Joseph et al. using XPS analysis.
Figure 9:
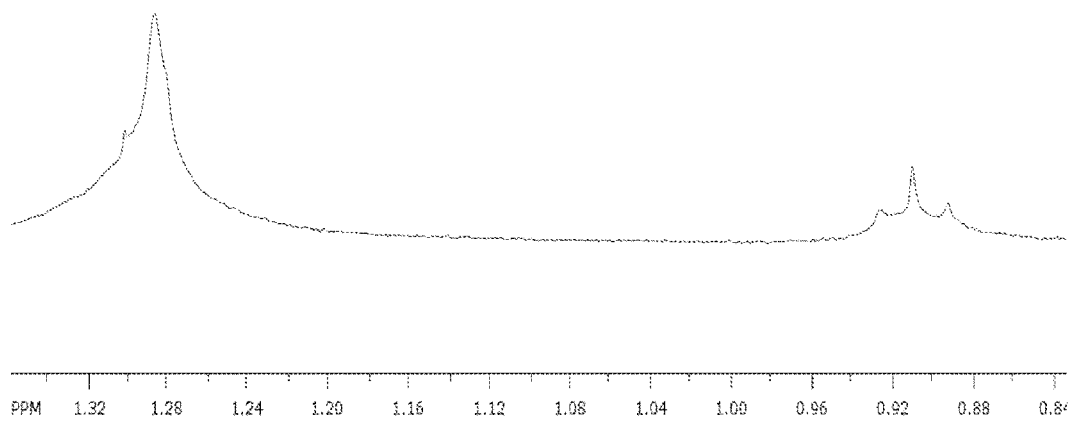
FIG. 9 shows $^1H$ NMR spectrum of dodecanethiolate-capped Au NPs (δ[ppm]: 1.29 ($CH_2$), 0.93 ($CH_3$) with characteristic peak broadening.

Another important parameter is the printing substrate. First, wetting between substrate and ink defines droplet "pixel" size as well as adhesion characteristics. Second, the anchoring properties of the surface play a crucial role in obtaining the desired alignment and electro-optical characteristics of an LC cell in the domains with printed NPs. A prerequisite condition for successful homeotropic alignment of nematic LCs on printed NPs is a stronger anchoring of the LC to the NPs in comparison to the homogeneous alignment "under-layer". Using this double-layer alignment method, we have shown that it is possible to manufacture cells with either homeotropic-hybrid or homeotropic-homogeneous director modulation. However, in the latter case, an additional step of substrate alignment is required. With the example of the NPs printed on the surface of PI-2555, it is clear that intermediate configurations between homeotropic and homogeneous are possible as well. Hence, by tuning the LC and the printing surface, it is likely possible to achieve any desired director modulation in a thin nematic LC film (FIG. 5a).

While the current results clearly demonstrate the possibility to utilize this method for patterned alignment of nematic LCs, some improvements are needed for a consistent process that can be applied for large-scale fabrication in industrial settings. Most importantly, the droplet volume of the printer cartridge limits the resolution of the printed patterns. With existing sub-femtoliter ink jet printers it should be possible to drastically reduce the pixel size and obtain resolutions comparable to photo-alignment and photolithography techniques, but in a much simpler and much easier and rapidly re-configurable process. This allows creating electro-optical devices that can work in the optical range, such as Bragg gratings and Fresnel lenses, among others. The resolution demonstrated here limits the applicability of the patterned alignment LC devices to the longer wavelengths of light, such as IR and beyond.

Also, the obtained samples on $SiO_x$ show homogeneous textures with two distinct domains, which are related to the degeneracy of the hybrid alignment in these domains. The 30° $SiO_x$, due to the symmetry of the evaporation process gives exactly zero pre-tilt alignment, and the induced pre-tilt of the rubbed homeotropic alignment layer reduces the number of domains but does not eliminate them completely. More careful choice of the homeotropic alignment layer and control over the baking/rubbing process may eliminate these defects completely.

The electro-optical effect of the dual alignment mode proposed in earlier work, where the gold NPs were introduced in the LC bulk or uniformly deposited on surfaces, was reproduced, and may lead to additional useful applications of patterned LC devices with printed NP patterns. Advancing this study related to this effect is the subject of future work.

Already established techniques for defining homeotropic director modulations in LCs including photo-alignment, see: O. Yaroshchuk, Y. Reznikov, J. Mater. Chem. 2012, 22, 286; for a review summarizing work up to 2000: K. Ichimura, Chem. Rev. 2000, 100, 1847, electrode patterning, see K. H. Kim, S. K. Kim, SID Digest, 2003, 34, 1208, and ion-beam alignment, see (a) P. K. Son, J. H. Park, S. S. Cha, J. C. Kim, T.-H. Yoon, S. J. Rho, B. K. Jeon, J. S. Kim, S. K. Lim, K. H. Kim, Appl. Phys. Lett. 2006, 88, 263512; (b) P. K. Son, S.-W. Choi, Surf Interf Analysis 2012, 44, 763, or UVO (ultraviolet/ozone) treatment, see J. B. Kim, C. J. Choi, J. S. Park, S. J. Jo, B. H. Hwang, M. K. Jo, D. Kang, S. J. Lee, Y. S. Kim, H. K. Bail, *Adv. Mater.* 2008, 20, 3073, can readily be applied to form high-resolution patterns. In contrast, ink jet printing provides unmatched simplicity, flexibility, and the possibility to use a wide range of substrates (including flexible plastic), and requires no spin coating, baking or additional wet processes. The ink jet printing process is easily scalable and allows printing large batches of the NP patterned substrates for smaller devices in one run without complex preparations (FIG. 5b). Another attractive feature is the simplicity of pattern preparation. Only a quick and simple bitmap graphics file needs to be created for printing of the pattern (FIG. 5c), ranging in size from microns to larger features (see cover suggestion), even entire panels.

In conclusion, we have demonstrated a new technique for obtaining patterned structures with modulated director configuration in LC thin films using ink jet printing of nanoparticles capped with a protective layer of hydrocarbon chain, for example alkylthiol-capped gold NPs featuring a unique electro-optic response for $\Delta\varepsilon > 0$ nematic LCs, see M. Urbanski, B. Kinkead, H. Qi, T. Hegmann, H.-S. Kitzerow, *Nanoscale* 2010, 2, 1118, in the printed patterned domains. The printed patterns are at least stable over several months, and do not show any deterioration with respect to the alignment quality or any migration of the NPs into the bulk of the aligned LC film. This approach allows production of low-cost electro-optical LC devices featuring a wide range of substrate materials including flexible, see G. C. Jensen, C. E. Krause, G. A. Sotzing, J. F. Rusling, *Phys. Chem. Chem. Phys.* 2011, 13, 4888, and uneven substrates due to the use of a printing jet as a non-contact technique. The approach applies to various unique types of nanomaterials (metal, carbon-based as well as magnetic and semiconducting metal chalcogenides, etc.), and builds on very easy design and fabrication processes used already in the LCD manufacturing industry for the printing of alignment layers. Applications include adaptive LC Fresnel lenses, Bragg diffraction gratings, vertical alignment mode LCDs (with or without patterned pixel design), and flexible LCDs, among others.

EXAMPLES

For the NP synthesis, all reagents were purchased from Sigma Aldrich except for hydrogen tetrachloroaurate (Alfa-Aesar). All solvents used were of EMD Millipore grade purified by a PureSolv solvent purification system (Innovative Technology Inc). Visible absorption spectra of the NPs in toluene were recorded using a dual cell OLIS 14 clarity spectrophotometer. Transmission electron microscopy (TEM) analysis was performed with a FEI Tecnai TF20 TEM instrument at an accelerating voltage of 200 kV. Samples were prepared by evaporating a drop of dilute toluene solution of particles onto a carbon-coated copper TEM grid (400 mesh) and dried overnight. The $^{1}$H NMR spectra were recorded in CDCl$_3$ at ambient temperature on a Bruker DMX 400 MHz spectrometer and referenced internally to residual solvent peaks at 7.26 ($^{1}$H). A Haake MARS rheometer was used to measure the viscosity of the nano-ink.

Figure 10:
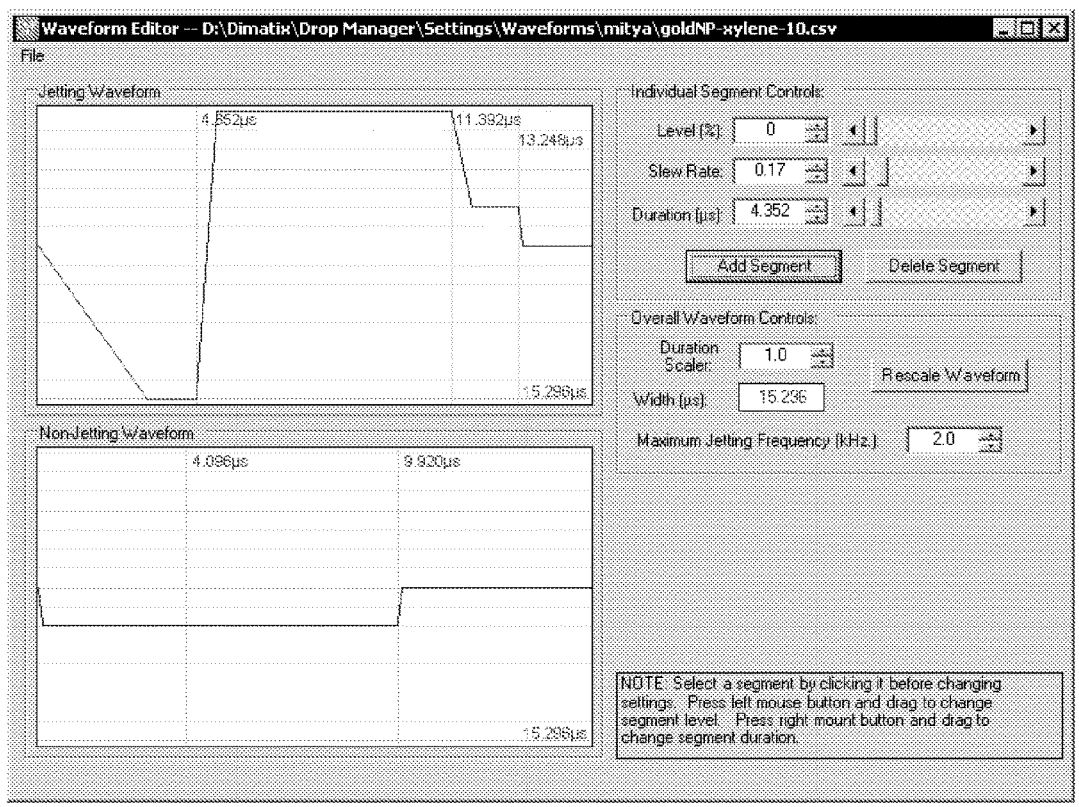
FIG. 10 shows jetting waveform used for the ink-jet printing of the nano-ink.
Figure 11:
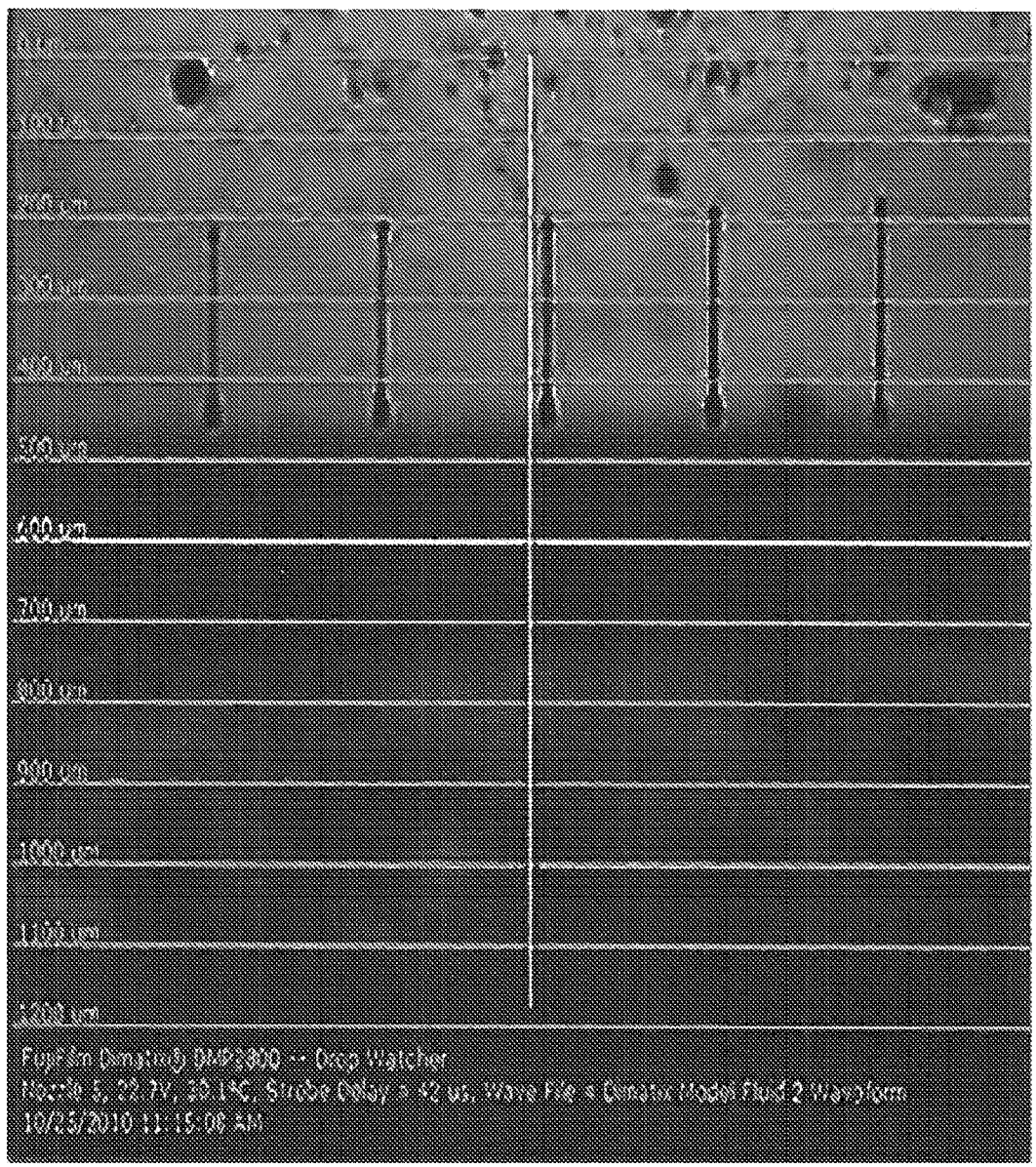
FIG. 11 shows "drop-watcher" of Dimatrix printer (multi-nozzle-mode) using gold NP ink.
Figure 12:
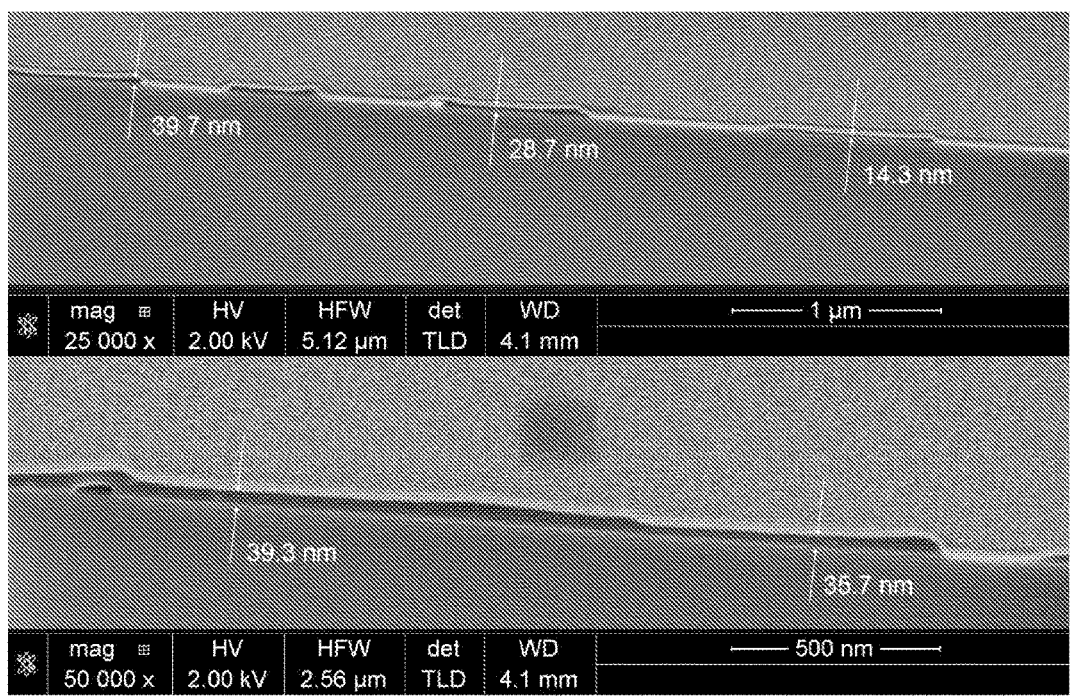
FIG. 12 shows FIB-SEM images of the printed multi-layer of Au NPs. The two images presented are different regions on the substrate and are taken with magnifications of 25,000× (top) and 50,000× (bottom). The averaged thickness of the NP multi-layer was calculated to be ~28 nm, i.e. about 5 layers of densely packed Au NPs.

For printing, we used the desktop material ink jet printer Fujifilm Dimatix DMP-2800 (Santa Clara, Calif.) and the cartridges DMCLCP-11610 and DMCLCP-11601. The used NP solution was mildly sonicated in a standard ultrasonic water bath for 1 minute before filling the printer cartridge. The cartridge was filled with the nano-ink according to the manufacturer's instructions. The cartridge was cleaned before the printing using the standard cleaning cycle ("Spit-Purge-Blot"). Occasionally, even initially well-dispersed NPs show some tendency for aggregation and clogging of the printing nozzles (i.e. the NP dry out in the nozzle, where the solvent evaporated). In such case, if the cartridge was not used for a prolonged period of time (usually several days), de-clogging by heating to 50° C. and running the cleaning cycle several times solved this issue. We found that the lifetime of a filled cartridge is at least 6 months after initial filling, after which time it becomes more difficult to de-clog. Jetting of the ink out of the nozzles is controlled by a "jetting waveform" that defines the application of voltage to the piezo-elements inside the cartridge, see FIG. 10 for a desirable waveform.

Focused ion beam assisted scanning electron microscopy (FIB-SEM) was performed on a FEI-Helios Nanolab 650 instrument at an accelerating voltage of 2 kV to measure the printed NP film/feature thickness. For these measurements, two layers of the NPs were printed right on top of one another on a pre-cleaned glass substrate (without ITO or an alignment layer), realized by the precise positioning of the substrate feature of the materials printer. The solvent was evaporated and the substrate was vacuum-dried at 35-40° C. The sample for FIB-SEM was prepared by coating the dried printed film on a glass substrate with a protective layer of palladium and platinum to protect the sample underneath from damage during the gallium ion milling employed to expose a cross-section of the printed sample area.

For the preparation of substrates for printing, a homogeneous alignment layer of SiO$_x$ evaporated at 30° was deposited using the vacuum thermal evaporation system produced by Kurt J. Lesker Company (Jefferson Hills, Pa.). Homogeneous alignment materials PI-2555 and polyvinyl alcohol (PVA) were purchased from HD Microsystems and Sigma Aldrich, respectively. The homeotropic alignment material SE-1211 was purchased from Nissan Chemicals. ITO-covered glass substrates were purchased from Colorado Concept Coating (Loveland, Colo.).

For the cell assembly, UV-sensitive adhesive Norland 68 and 5 μm silica spheres spacers from Nippon were used. A vacuum LC cell filling station from LC Technologies was used for the filling of the cells.

The liquid crystals used in the experiments were 5-n-heptyl-2-(4-n-octyloxy-phenyl)pyrimidine (Felix-2900-03) from Synthon Chemicals, 4-cyano-4'-pentylbiphenyl (5CB) from TCI, the positive $\Delta\varepsilon$ mixture TL203, and the negative $\Delta\varepsilon$ mixture MLC-6610 both from Merck (see Table 51, SI).

Assembled and filled LC cells were observed using a polarized light optical microscope (Olympus BX-53). The azimuthal axis of the liquid crystal director was approximately at 45° with respect to the axis of the crossed polarizer and analyzer. The temperature of the cell was controlled by a hot stage (Linkam LTS420E). A function generator card (National Instruments PCI-5402) was used to drive the cells for electro-optics observations. A digital oscilloscope (Agilent DSOX2012A) was used to control the driving waveform.

All glassware used for preparation and storage of nanoparticles (NPs) and nano-ink was treated with aqua regia, rinsed with deionized (DI) water (Millipore, resistivity 18.2 MΩ) and acetone, and then dried at 120° C. Gold NPs capped with dodecanethiol were synthesized using the two-phase Brust-Schiffrin method, see M. Brust, M. Walker, D. Bethell, D. J. Schiffrin, R. Whyman, *J. Chem. Soc., Chem. Comm.* 1994, 801. Briefly, tetraoctylammonium bromide (347 mg, 0.63 mmol) was dissolved in dry toluene (25 mL) and was added to HAuCl$_4$.3H$_2$O (100 mg, 0.25 mmol) dissolved in DI water (10 mL). The mixture was allowed to vigorously stir for 15 minutes to ensure complete transfer of AuCl$_4^-$ into the toluene phase (color changes to orange). Dodecanethiol (0.97 mL, 4.06 mmol) was added, and the color immediately changed from orange to grey-white. Then, sodium borohydride (19 mg, 0.507 mmol), dissolved in DI water (1 mL), was added over a time period of 30 seconds. The color of the organic layer changed to reddish-brown. The reaction mixture was allowed to stir for three hours. Thereafter, the aqueous layer was removed and the organic layer evaporated under vacuum at 70 mbar (keeping the temperature below 45° C.). The NPs were then precipitated by adding 250 mL of ethanol, and this solution was kept at 4° C. for four hours. The precipitate formed was collected by centrifugation. The re-dispersion and precipitation process was repeated twice. Finally, particles were washed with methanol and acetone followed by DI water. The obtained black precipitate was then dissolved in chloroform, the solvent removed under vacuum, and the particles dried under dry nitrogen (covering the flask with aluminum foil). The purified NPs were characterized by $^1$H NMR spectroscopy, UV-vis spectrophotometry, and HR-TEM analysis/imaging. The obtained gold NPs were stable and did not show signs of decomposition over a period of several months. The NPs size determined by TEM image analysis was determined to 1.9±0.4 nm. The synthesized gold NPs did not show a weak surface plasmon resonance peak, which further supported that particles are smaller than 5 nm, see A. Henglein, D. Meisel, *Langmuir* 1998, 14, 7392, and A. Henglein, *Langmuir* 1998, 14, 6738.

Figure 13:
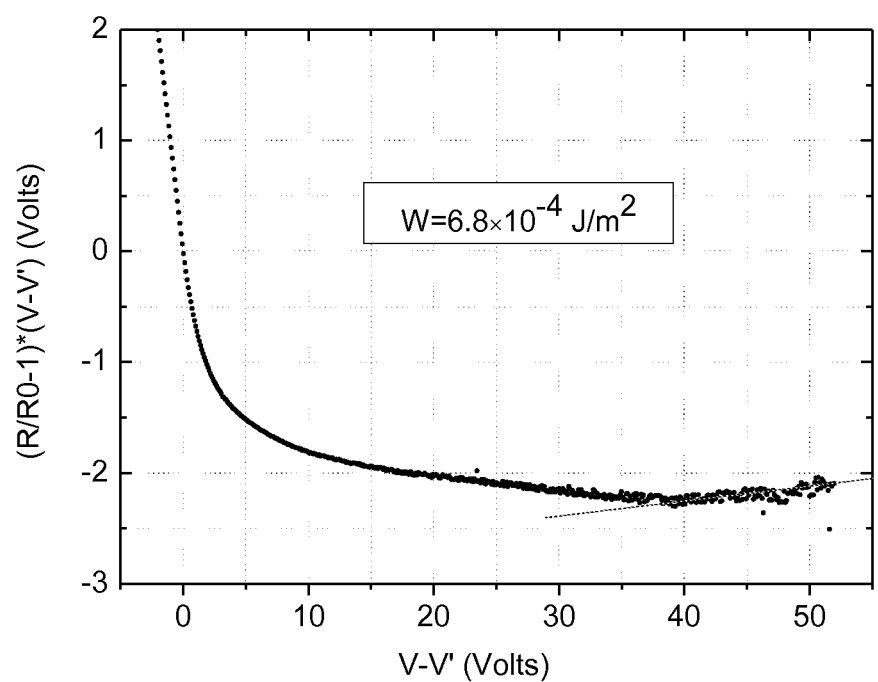
FIG. 13 shows determining the polar anchoring energy using the slope fitting method following. The result of W=$6.8 \times 10^{-4}$ $J/m^2$ was obtained for the 4.8 μm MLC6610 VA cell with the printed NPs used as the homeotropic alignment layer.
Figure 14:
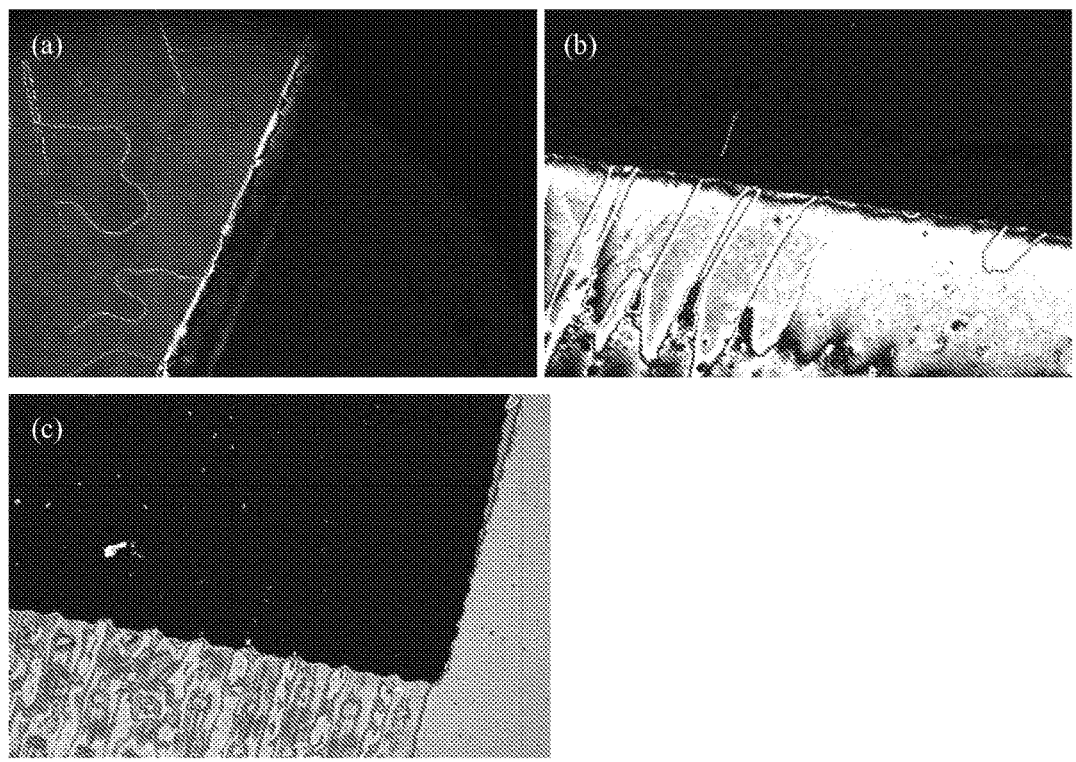
FIG. 14 shows square alignment pattern (fully homeotropic) for various nematic LCs (Surface 1: ITO+30° $SiO_x$+ printed NPs; Surface 2: ITO+30° $SiO_x$+printed NPs): (a) Felix-2900-03 (printed pattern at right), (b) MLC-6610 (printed pattern at top), and (c) TL203 (printed pattern top left)
Figure 15:
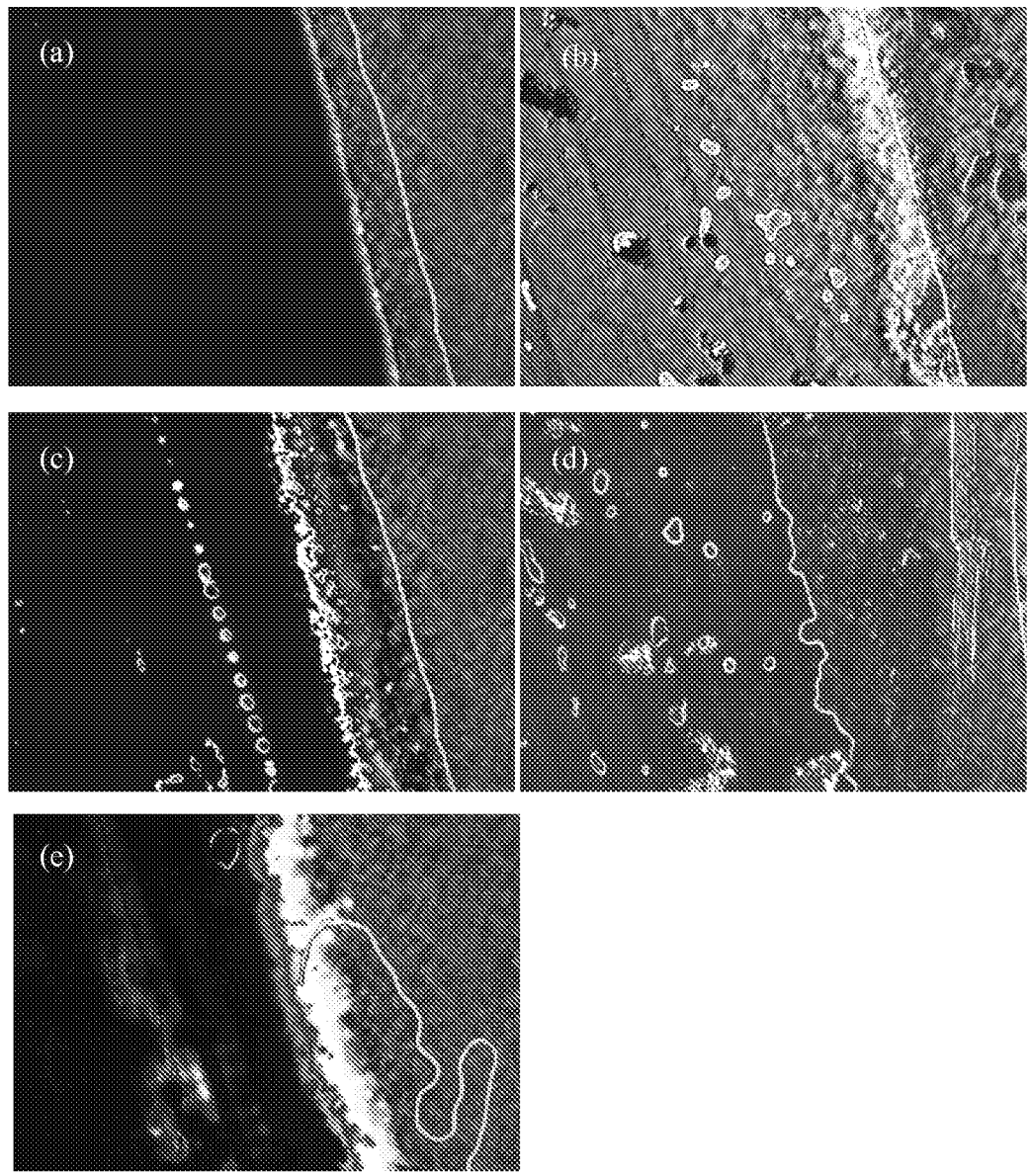
FIG. 15 shows dual electro-optic mode for Felix-2900-03 observed on cooling from the isotropic phase 3° C. below $T_{Iso/N}$ in a cell with the following substrates (left side with printed square feature): surface 1: ITO+30° $SiO_x$+printed NPs; surface 2: ITO+30° $SiO_x$+printed NPs. (a) E=0 V, (b) Field ON: E=5 V DC, (c) Field OFF: E=0 V, (d) Field ON: E=−5 V, and (e) Field OFF: E=0 V. (DC or low frequency AC field, 0.5 Hz)
Figure 16:
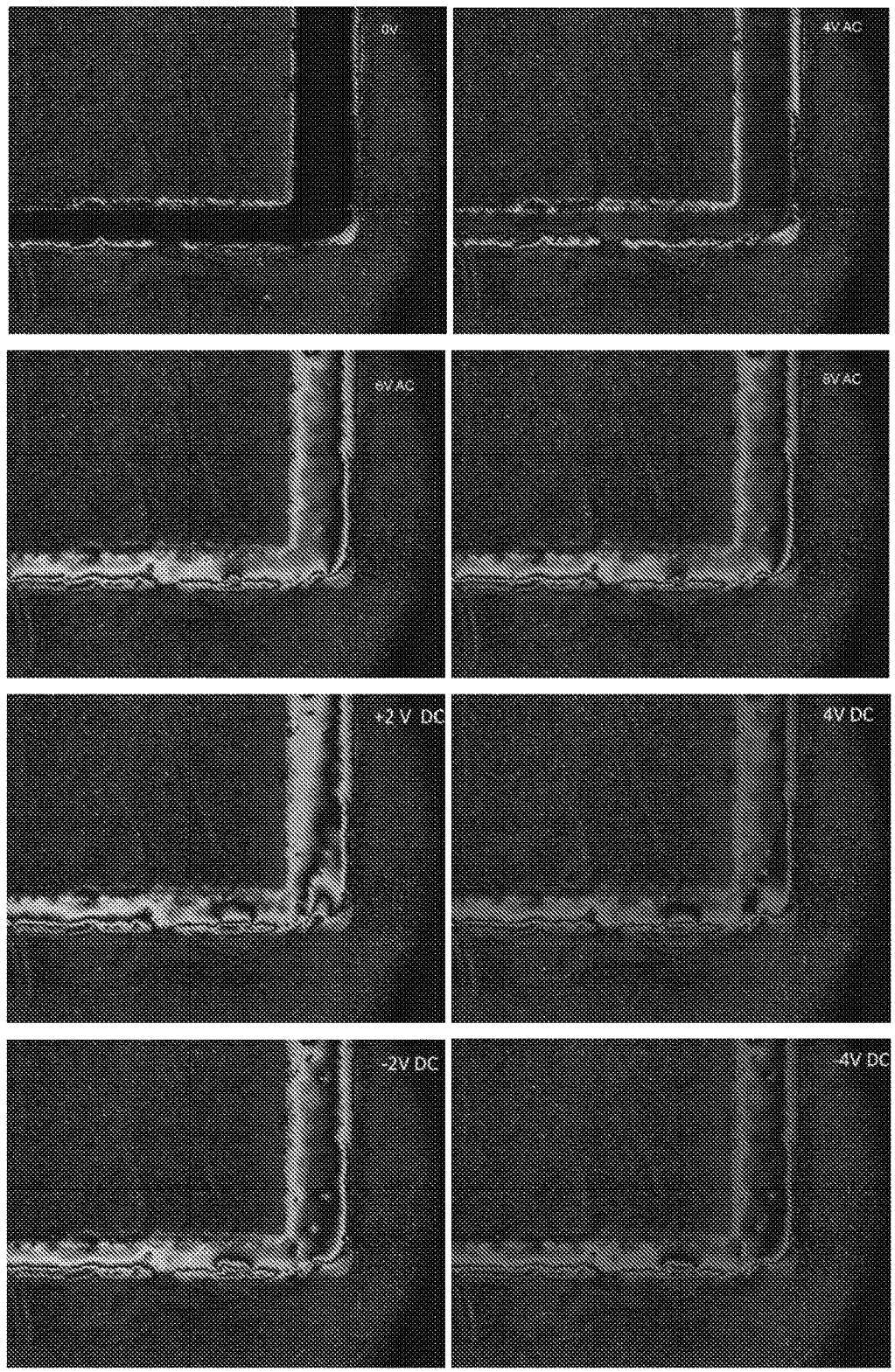
FIG. 16 shows dual electro-optic mode observed for Δε<0 LC mixture MLC-6610 at room temperature in a cell (cell gap: 5 μm) with the following substrates: surface 1: ITO+ printed NPs with L-shaped feature (width: 200-300 μm; surface 2: ITO. DC and AC (0.5 Hz-1 kHz) voltages as indicated in the figure.

The polar anchoring energy was measured in the following experiment following the method described in X. Nie, Y. H. Lin, T. X. Wu, H. Wang, Z. Ge, S. T. Wu, *J. Appl. Phys.* 2005, 98, 013516. A vertical alignment (VA) liquid crystal cell with the cell gap of 4.8 μm was made with the NPs printed on both surfaces (ITO-covered glass substrates). The cell was filled with the liquid crystal mixture MLC6610 with negative dielectric anisotropy (Δε=−3.1). The cell was placed between crossed polarizers with the azimuthal projection of the director at the 45° angle to the polarizers' transmission axis. Optical transmission of the system as a function of applied AC-voltage (f=10 kHz) was measured. This curve was used to calculate the cell's phase retardation R as a function of applied voltage V, the values of threshold voltage, and the maximum phase retardation of the cell $R_0$. We used the theoretical value of the cell capacitance instead of experimental one, which slightly decreases (usually within 5%) the accuracy of the measurement, but makes the experiment much simpler. The anchoring energy value was calculated using the fitting slope method from the normalized phase retardation as the function of the reduced voltage V-V' (see FIG. 13).

While in accordance with the patent statutes the best mode and preferred embodiment have been set forth, the scope of the invention is not limited thereto, but rather by the scope of the attached claims.

What is claimed is:

1. An ink-jet printable composition, comprising:
   a solution of nanoparticles capped with a protective layer of hydrocarbon chains and a single solvent that provides a viscosity of about 7 to about 15 cPs and a surface tension of about 20 to about 50 dynes/cm; and
   wherein said protective layer of hydrocarbon chains comprise a chiral group bonded by a linkage compound to the nanoparticle.

2. The composition according to claim 1, wherein a concentration of the nanoparticle capped with the protective layer of hydrocarbon chains ranges from about 10 to about 100 mg/ml, wherein the nanoparticle comprises a metallic, metal oxide, metal chalcogenide, or carbon-based core, and wherein the linkage compound comprises a bis-thiol linkage, a thiosulfate linkage, a phosphorus linkage, a silane linkage, a siloxane linkage, or a carboxylate group.

3. The composition according to claim 2, wherein the concentration ranges from about 10 to about 75 mg/ml, and wherein the nanoparticle capped with the protective layer of hydrocarbon chains comprises a metal chalcogenide or carbon-based core.

4. The composition according to claim 2, wherein the metallic core of the nanoparticle capped with a protective layer of hydrocarbon chains is gold, silver, platinum or palladium.

5. The composition according to claim 4, wherein the solution of the capped nanoparticles and the solvent has the viscosity of from about 10 to about 12 cPs and a surface tension of from about 28 to about 42 dynes/cm.

6. The composition according to claim 4, wherein the nanoparticle capped with the protective layer of hydrocarbon chains is a metal nanoparticle with alkyl thiol-capping.

7. The composition according to claim 6, wherein the solvent consists of o-xylene.

* * * * *